(12) United States Patent
Cao et al.

(10) Patent No.: US 11,372,668 B2
(45) Date of Patent: Jun. 28, 2022

(54) MANAGEMENT OF A CONTAINER IMAGE REGISTRY IN A VIRTUALIZED COMPUTER SYSTEM

(71) Applicant: VMware, Inc., Palo Alto, CA (US)

(72) Inventors: Yanping Cao, San Carlos, CA (US); Mark Russell Johnson, McKinleyville, CA (US); Pratik Kapadia, Sunnyvale, CA (US); Xiaoyun An, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 95 days.

(21) Appl. No.: 16/838,526

(22) Filed: Apr. 2, 2020

(65) Prior Publication Data

US 2021/0311758 A1 Oct. 7, 2021

(51) Int. Cl.
*G06F 9/455* (2018.01)
*G06F 9/54* (2006.01)
*G06F 8/61* (2018.01)
*G06F 9/50* (2006.01)

(52) U.S. Cl.
CPC ............ *G06F 9/45558* (2013.01); *G06F 8/63* (2013.01); *G06F 9/5027* (2013.01); *G06F 9/54* (2013.01); *G06F 2009/45591* (2013.01); *G06F 2009/45595* (2013.01)

(58) Field of Classification Search
CPC ...... G06F 9/45558; G06F 8/63; G06F 9/5027; G06F 9/54; G06F 2009/45591; G06F 2009/45595

See application file for complete search history.

(56) References Cited

U.S. PATENT DOCUMENTS

| 10,057,273 | B1 * | 8/2018 | Chakraborty | ........... G06F 21/62 |
| 2017/0060613 | A1 * | 3/2017 | Warkentin | .......... G06F 9/45545 |
| 2017/0180346 | A1 * | 6/2017 | Suarez | ..................... G06F 8/71 |

(Continued)

OTHER PUBLICATIONS

Clements, S. et al. "Harbor Registry User Guide," GitHub, Inc., 2019, 101 pages, URL: https://github.com/goharbor/harbor/blob/release-1.9.0/docs/user_guidemd#robot-account.

(Continued)

*Primary Examiner* — Emerson C Puente
*Assistant Examiner* — Jonathan R Labud
(74) *Attorney, Agent, or Firm* — Kim & Stewart LLP

(57) ABSTRACT

A container image registry is managed in a virtualized computing system. The container image registry manages container images for deploying containers in a host cluster, the host cluster includes hosts and a virtualization layer executing on hardware platforms of the hosts, and the virtualization layer supports execution of virtual machines (VMs). The method includes: creating a namespace for an orchestration control plane integrated with the virtualization layer, the namespace including constraints for deploying workloads in the VMs; invoking, by a registry service in response to creation of the namespace, a management application programming interface (API) of the container image registry to create a project for the container images; and invoking, by the registry service, the management API of the container image registry to both add members to the project, and assign image registry roles to the members, in response to bindings of users and namespace roles derived from the constraints.

17 Claims, 13 Drawing Sheets

(56) References Cited

U.S. PATENT DOCUMENTS

| | | |
|---|---|---|
| 2017/0371693 A1 | 12/2017 | Corrie et al. |
| 2018/0268115 A1* | 9/2018 | Zhang ................... G06F 9/455 |
| 2018/0278639 A1* | 9/2018 | Bernstein ............. G06F 21/577 |
| 2018/0357068 A1* | 12/2018 | Ambichl ............. G06F 9/44521 |
| 2021/0117308 A1* | 4/2021 | Burgos ............... G06F 11/3409 |

OTHER PUBLICATIONS

Ernst, E. et al. "Kata Containers Architecture," GitHub, Inc., 2019, 22 pages, URL: https://github.com/kata-containers/documentation/blob/master/design/architecture.md.

Vmware, Inc. "Overview of vSphere Integrated Containers," Product version: 1.5, 2019, 21 pages.

Zhang, H. et al. "Architecture Overview of Harbor," GitHub, Inc., 2016, 5 pages, URL: https://github.com/goharbor/harbor/wiki/Architecture-Overview-of-Harbor/9ce0665e1a8d14fb6a12ba8029dt778a151de386.

U.S. Appl. No. 16/751,529, filed Jan. 24, 2020, 48 pages.

* cited by examiner

MANAGEMENT OF A CONTAINER IMAGE REGISTRY IN A VIRTUALIZED COMPUTER SYSTEM

Applications today are deployed onto a combination of virtual machines (VMs), containers, application services, and more. For deploying such applications, a container orchestration platform known as Kubernetes® has gained in popularity among application developers. Kubernetes provides a platform for automating deployment, scaling, and operations of application containers across clusters of hosts. It offers flexibility in application development and offers several useful tools for scaling.

In a Kubernetes system, containers are grouped into logical unit called "pods" that execute on nodes. Containers in the same pod share the same resources and network and maintain a degree of isolation from containers in other pods. A container registry provides container image services on behalf of container engines executing in the nodes. Container image services include pulling container images from, and pushing container images to, the container registry. Users can access a container registry using a client of the container engine or through the Kubernetes using a Kubernetes secret. A typical login through a container engine client requires the user to provide a username and password, which may be cached in some manner by the container engine or container engine client. A Kubernetes secret stores and manages user credentials, such as usernames and passwords. The control plane in a Kubernetes system (e.g., a Kubernetes master) include a database that stores the secrets.

With either access method, user credentials are stored or cached by the container engine or Kubernetes system. In some cases, a user's credentials can be used to access other systems through a single sign-on (SSO) platform. Caching or storing a user's SSO credentials outside of the SSO platform can present a security risk to the systems that rely on the SSO platform for user authentication.

The container image registry supports logical containers of images and image repositories (referred to herein as "projects"). A project can have members (e.g., users) that are assigned roles (e.g., developer, guest, etc.). The Kubernetes system supports logical containers for resources referred to as namespaces. Kubernetes manages user permissions in namespaces using role bindings. However, the registry resources (projects, users, assigned roles) are managed separately from the Kubernetes resources (namespaces, users, role bindings), which requires disparate administration of the Kubernetes cluster and the container image registry.

SUMMARY

In an embodiment, a method of managing a container image registry in a virtualized computing system is described. The container image registry manages container images for deploying containers in a host cluster, the host cluster includes hosts and a virtualization layer executing on hardware platforms of the hosts, and the virtualization layer supports execution of virtual machines (VMs). The method includes: creating, by a virtualization management server managing the host cluster, a namespace for an orchestration control plane integrated with the virtualization layer, the namespace including constraints for deploying workloads in the VMs; invoking, by a registry service executing in the virtualization management server in response to creation of the namespace, a management application programming interface (API) of the container image registry to create a project for the container images; and invoking, by the registry service, the management API of the container image registry to both add members to the project, and assign image registry roles to the members, in response to bindings of users and namespace roles derived from the constraints.

Further embodiments include a non-transitory computer-readable storage medium comprising instructions that cause a computer system to carry out the above methods, as well as a computer system configured to carry out the above methods.

DETAILED DESCRIPTION

Figure 1:
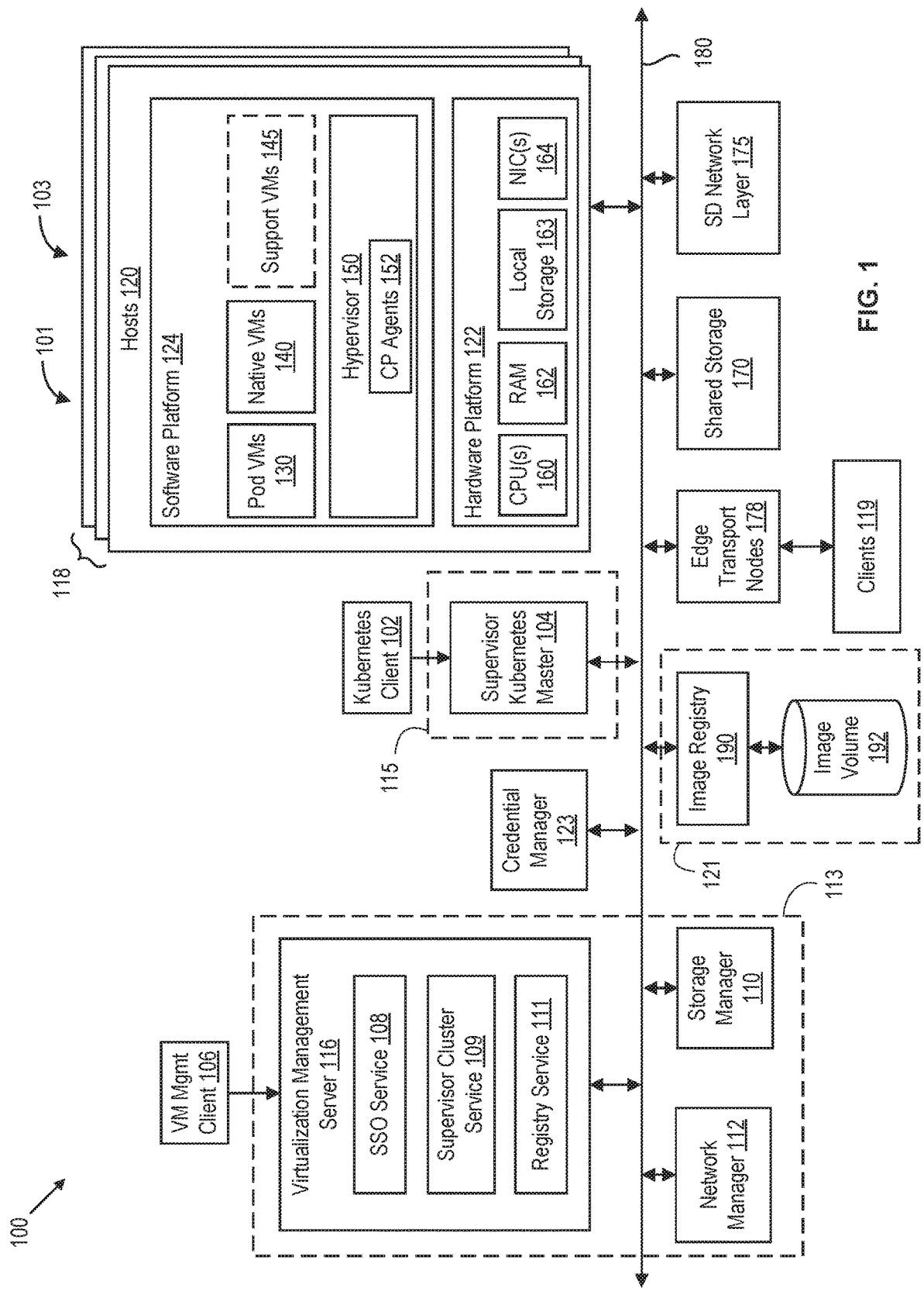
FIG. 1 is a block diagram of a virtualized computing system in which embodiments may be implemented.

Techniques for secured login management to a container image registry in a virtualized computing system are described. In embodiments described herein, the virtualized computing system includes a cluster of physical servers ("hosts") referred to as a "host cluster." The host cluster includes a virtualization layer, executing on host hardware platforms of the hosts, which supports execution of virtual machines (VMs). A virtualization management server manages the host cluster, the virtualization layer, and the VMs executing thereon. The virtualization management server, together with storage and network management platforms, forms a virtual infrastructure (VI) control plane of the virtualized computing system. The host cluster is the data plane, which supports execution of workloads in VMs to implement various applications.

In embodiments, the virtualization layer of the host cluster is integrated with an orchestration control plane, such as a Kubernetes control plane. This integration enables the host cluster as a "supervisor cluster" that uses VMs to implement both control plane nodes having a Kubernetes control plane, and compute nodes managed by the control plane nodes. For example, Kubernetes pods are implemented as "pod VMs," each of which includes a kernel and container engine that supports execution of containers. In embodiments, the Kubernetes control plane of the supervisor cluster is extended to support custom objects in addition to pods, such as VM objects that are implemented using native VMs (as opposed to pod VMs). A VI administrator (VI admin) can enable a host cluster as a supervisor cluster and provide its functionality to development teams.

In embodiments, the virtualized computing system includes a container image registry, integrated with the host cluster, to provide container image services for containerized workloads executing in VMs. A container image (also referred to herein as an "image") is a read-only template with instructions for creating a container (e.g., a container is an executable instance of an image). The container image registry (also referred to as "image registry") stores images and image repositories (e.g., a set of versions of an image) A VI administrator provisions and manages the lifecycle of the image registry. Once provisioned and configured, the developers can pull images from the image registry when deploying containers in VMs. In addition, developers can pull images directly from, and push images directly to, the image registry. In a supervisor cluster, the orchestration control plane can pull images from the image registry when deploying pod VMs. The image registry exposes an application programming interface (API) for use by clients (e.g., users or the orchestration control plane) for pulling and pushing images.

For security, the virtualized computing system includes a credential manager that authenticates and authorizes clients requesting to pull or push images using the API of the image registry. In embodiments, some clients are directly operated by users having user accounts managed by a single sign-on (SSO) platform of the virtualized computing system (referred to as "SSO users" that have "SSO accounts"). Other clients are services operated by the orchestration control plane. In embodiments, there are three use cases requiring authentication and authorization. (1) A developer may login as an SSO user to the image registry to pull/push images via a client; (2) A developer may login as an SSO user to the orchestration control plane of a supervisor cluster to deploy pod VMs, which results in an image service of the orchestration control plane requesting pull access to the image registry; and (3) A developer may login as an SSO user to the orchestration control lane of a supervisor cluster to create a service account, where the service account automatically deploys pod VMs, which results in an image service requesting pull access to the image registry.

For use case (1), the techniques described herein have SSO users login to the image registry using session token-based authentication. A credential helper application cooperates with the credential manager to obtain a session token for the SSO user from the SSO platform. The credential manager validates and accepts the session token for push and/or pull access to the image registry. In this manner, sensitive SSO user credentials (e.g., username and password) are not stored or cached by the client accessing the image registry. For use cases (2) and (3), logins to the image registry are secured by an image pull secret maintained by the supervisor cluster orchestration control plane (e.g., a Kubernetes secret). The image pull secret, however, does not store SSO user credentials in the form a username and password. Rather, the image registry includes a robot account having image pull access. The image pull secret refers to a session token of the robot account (referred to as an "automation token") that has the credentials of the robot account Pod deployment operations are gated by authentication and authorization of SSO users at the orchestration control plane level. The pod deployment operations use the automation token to log into the image registry for image pull access.

Techniques for management of a container image registry in a virtualized computing system are further described. In embodiments, the image registry manages projects, which are logical groupings of images. The image registry manages project access via project members ("members") who are assigned roles ("image registry roles") that grant one or more permissions ("image permissions"). Project members can be users (e.g., SSO users of the virtualized computing system) or robot accounts. In embodiments, the image registry roles include a "master" role that grants both push and pull image permissions, and a "guest" role that grants only a pull image permission.

The VI and orchestration control planes manage namespaces (referred to herein as "supervisor namespaces"), which provide resource constraints, user access constraints, and policies. A supervisor namespace provides a constrained environment in which users can deploy workloads on the supervisor cluster. The user access constraints of a namespace include roles (referred to as "namespace roles") applied to users (e.g., SSO users) through role bindings. In embodiments, the namespace roles include an edit role and a view role. The edit role assigns a user bound to that namespace role create/read/update/delete permissions within the namespace (e.g., allowing for pod deployment and deletion). The view role assigns a user bound to that namespace role read permission (e.g., allowing for a list of deployed pods).

The image registry is integrated with the VI and orchestration control planes, which provide for automated project management on the image registry. In embodiments, the virtualized computing system maintains a 1:1 mapping of a supervisor namespace to a project dedicated to that namespace (e.g., a private project for the namespace). The VI and orchestration control planes cooperate with the image registry to automatically create a project for each created supervisor namespace. The virtualized computing system also maintains a 1:1 mapping of SSO users or groups assigned namespace roles to project members. The VI and orchestration control planes cooperate with the image registry to map namespace roles to image registry roles. In embodiments, the edit namespace role is mapped to the master role of the image registry, which allows users having edit/view permissions on the namespace to have image push/pull permissions. The view namespace role is mapped to the guest role of the image registry, which allows users having view permission on the namespace to have image pull permission. These and further advantages and aspects of the disclosed techniques are described below with respect to the drawings.

FIG. 1 is a block diagram of a virtualized computing system 100 in which embodiments may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a network 180. Network 180 is a physical network that enables communication between hosts 120 and between other components and hosts 120 (other components discussed further herein).

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (VSAN), which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, Calif. In the example of FIG. 1, host cluster 118 is enabled as a "supervisor cluster," described further herein, and thus VMs executing on each host 120 include pod VMs 130 and native VMs 140. Some native VMs 140, shown as support VMs 145, have specific functions within host cluster 118. For example, support VMs 145 can provide control plane functions, edge transport functions, and the like. An embodiment of software platform 124 is discussed further below with respect to FIG. 2.

Host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., the public Internet). Edge transport nodes 178 can include a gateway/router between the internal logical networking of host cluster 118 and the external network. Edge transport nodes 178 can be physical servers or VMs. For example, edge transport nodes 178 can be implemented in support VMs 145 and include a gateway/router of SD network layer 175. Various clients 119 can access respective components in virtualized computing system through edger transport nodes 178 (including VM management client 106 and Kubernetes client 102, which as logically shown as being separate by way of example).

Virtualization management server 116 is a physical or virtual server that manages host cluster 118 and the virtualization layer therein. Virtualization management server 116 installs a control plane (CP) agent ("CP agent 152") in hypervisor 150 to add a host 120 as a managed entity. Virtualization management server 116 logically groups hosts 120 into cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in cluster 118 may be one or many. Virtualization management server 116 can manage more than one host cluster 118.

In an embodiment, virtualization management server 116 further enables host cluster 118 as a supervisor cluster 101. Virtualization management server 116 installs additional CP agents 152 in hypervisor 150 to add host 120 to supervisor cluster 101. Supervisor cluster 101 integrates an orchestration control plane 115 with host cluster 118. In embodiments, orchestration control plane 115 is derived from Kubernetes. In supervisor cluster 101, hosts 120 become nodes for use by orchestration control plane 115. Virtualization management server 116 provisions one or more virtual servers as "master servers," which function as management entities in orchestration control plane 115. In the embodiment of FIG. 1, supervisor cluster 101 includes a supervisor Kubernetes master 104 that functions as such a master server. For purposes of clarity, supervisor Kubernetes master 104 is shown as a separate logical entity. For practical implementations, supervisor Kubernetes master 104 can be implemented as a VM 140/145 (an optionally one or more pod VMs 130) in host cluster 118. Further, although only one supervisor Kubernetes master 104 is shown, supervisor cluster 101 can include more than one supervisor Kubernetes master 104 in a logical cluster for redundancy and load balancing. Although host cluster 118 in FIG. 1 is enabled as supervisor cluster 101, the secured login management techniques described herein can be employed without enabling supervisor cluster 101.

In an embodiment, virtualized computing system 100 further includes storage manager 110. Storage manager 110 is a physical or virtual server that provisions virtual disks in shared storage 170 (including a VSAN formed from local storage 163) as independent objects. That is, virtual disks that persist apart from the lifecycle of any VM or container. Various components can interact with storage manager 110 to provision persistent storage, such as virtualization management server 116 and supervisor Kubernetes master 104.

Storage manager 110 can operate independently from virtualization management server 116 (e.g., as an independent physical or virtual server). Alternatively, storage manager 110 can be a service in virtualization management server 116.

In an embodiment, virtualized computing system 100 further includes a network manager 112. Network manager 112 is a physical or virtual server that manages logical network services of SD network layer 175. In an embodiment, network manager 112 comprises one or more virtual servers deployed as VMs. Network manager 112 installs additional control plane agents 152 and data plane (DP) modules in hypervisor 150 to add a host 120 as a managed entity, referred to as a transport node. In this manner, host cluster 120 can be a cluster 103 of transport nodes. One example logical network platform that can be configured and used in embodiments described herein as network manager 112 and SD network layer 175 is a VMware NSX® platform made commercially available by VMware, Inc. of Palo Alto, Calif.

In an embodiment, system 100 further includes an image registry 190 and an image volume 192. As described further herein, containers of supervisor cluster 101 execute in pod VMs 130. The containers in pod VMs 130 are spun up from container images managed by image registry 190. Image registry 190 manages images and image repositories stored on an image volume 192. Image volume 192 includes persistent storage provisioned from shared storage 170. Image registry 190 requires users to be authenticated and authorized for image push or pull access. Accordingly, virtualized computing system 100 includes credential manager 123. Credential manager 123 is configured to authenticate users of image registry 190, as well as authorize users for image push and/or pull access. While credential manager 123 is shown logically separate in FIG. 1, credential manager 123 comprises software executing in one or more components. In embodiments, host cluster 118 is not enabled as supervisor cluster 101 and supervisor Kubernetes master 104 is not present. In such embodiments, credential manager 123 includes software executing in image registry 190 (e.g., registry authentication/authorization (auth) service 306 discussed below). In other embodiments, where host cluster 118 is enabled as supervisor cluster 101, credential manager 123 can include a first component (e.g., registry auth service 306) executing in image registry 190 and a second component (e.g., auth proxy 322 shown in FIG. 3) executing in supervisor Kubernetes master 104. Thus, the term credential manager encompasses software, which can either execute in a single component or be distributed across components, and which performs the various functions described herein for authentication and authorization. Specific services (e.g., registry auth service 306, auth proxy 322) are referred to in the specific embodiments described herein.

Virtualization management server 116, network manager 112, and storage manager 110 comprise a virtual infrastructure (VI) control plane 113 for host cluster 118, shared storage 170, and SD network layer 175. The management and control functions are performed by a server virtualization control plane 117 executing in virtualization management server 116. Virtualization management server 116 can include single sign-on (SSO) service 108, supervisor cluster service 109, and registry service 111.

SSO service 108 comprises security token service, administration server, directory service, identity management service, and the like configured to implement an SSO platform for virtualized computing system 100. Virtualization management server 116 manages objects, such as data centers, clusters, hosts, VMs, resource pools, datastores, and the like, each of which are assigned permissions. Each permission specifies for one group or user which privileges that group or user has on the object. SSO service 108 authenticates users and groups of users defined in an identity source. Users are provided SSO credentials to login to the SSO platform (e.g., username and password). Privileges, which are fine grained access controls, are assigned to authenticated users and groups Virtualization management server 116 can have defined roles, each of which is a set of privileges. Roles allow a VI admin to assign permissions on an object based on a typical set of tasks that users perform. In embodiments, credential manager 123 cooperates with SSO service 108 to authenticate SSO users in response to their SSO credentials. SSO service 108 generates session tokens for authenticated SSO users. Credential manager 123 can return session tokens to clients 119, which then use the session tokens to login to image registry 190. Session tokens can be Javascript® Object Notation (JSON) Web Tokens (JWTs), Security Assertion Markup Language (SAML) tokens, or the like.

Supervisor cluster service 109 performs the functions of virtualization management server 116 described above to enable host cluster 118 as supervisor cluster 101. Registry service 111 administers image registry 190. Registry service 111 includes a resource model having registry, project, and image objects. The registry object represents image registry 190 for host cluster 118. The project object represents a logical container for storing images. The image object represents an individual image in a project. Registry service 111 is configured to perform lifecycle management of image registry 190, lifecycle management of projects, image registry health monitoring, project and image statistic collection, project and image replication, and the like. Registry service 111, image registry 190, and a registry agent (described below) form the parts of a cluster image registry 121 for host cluster 118.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, enable supervisor cluster 101, deploy and manage image registry 190, and the like.

Kubernetes client 102 represents an input interface for a user to supervisor Kubernetes master 104. Kubernetes client 102 is commonly referred to as kubectl. Through Kubernetes client 102, a user submits desired states of the Kubernetes system, e.g., as YAML documents, to supervisor Kubernetes master 104. In embodiments, the user submits the desired states within the scope of a supervisor namespace. A "supervisor namespace" is a shared abstraction between VI control plane 113 and orchestration control plane 115. Each supervisor namespace provides resource-constrained and authorization-constrained units of multi-tenancy. A supervisor namespace provides resource constraints, user-access constraints, and policies (e.g., storage policies, network policies, etc.). Resource constraints can be expressed as quotas, limits, and the like with respect to compute (CPU and memory), storage, and networking of the virtualized infrastructure (host cluster 118, shared storage 170, SD networking 175). User-access constraints include definitions of users, roles, permissions, bindings of roles to users, and the like. Each supervisor namespace is expressed within orchestration control plane 115 using a namespace native to orchestration control plane 115 (e.g., a Kubernetes namespace or generally a "native namespace"), which allows users to deploy applications in supervisor cluster 101 within the scope of supervisor namespaces. Supervisor Kubernetes master 104 configures supervisor cluster 101 to match the desired state by creating pod VMs 130, creating native VMs 140, connecting VMs to storage and logical networks, destroying pod VMs 130 and native VMs 140, and the like, all within the scope of supervisor namespaces. In this manner, the user interacts with supervisor Kubernetes master 104 to deploy applications in supervisor cluster 101 within defined supervisor namespaces.

Figure 2:
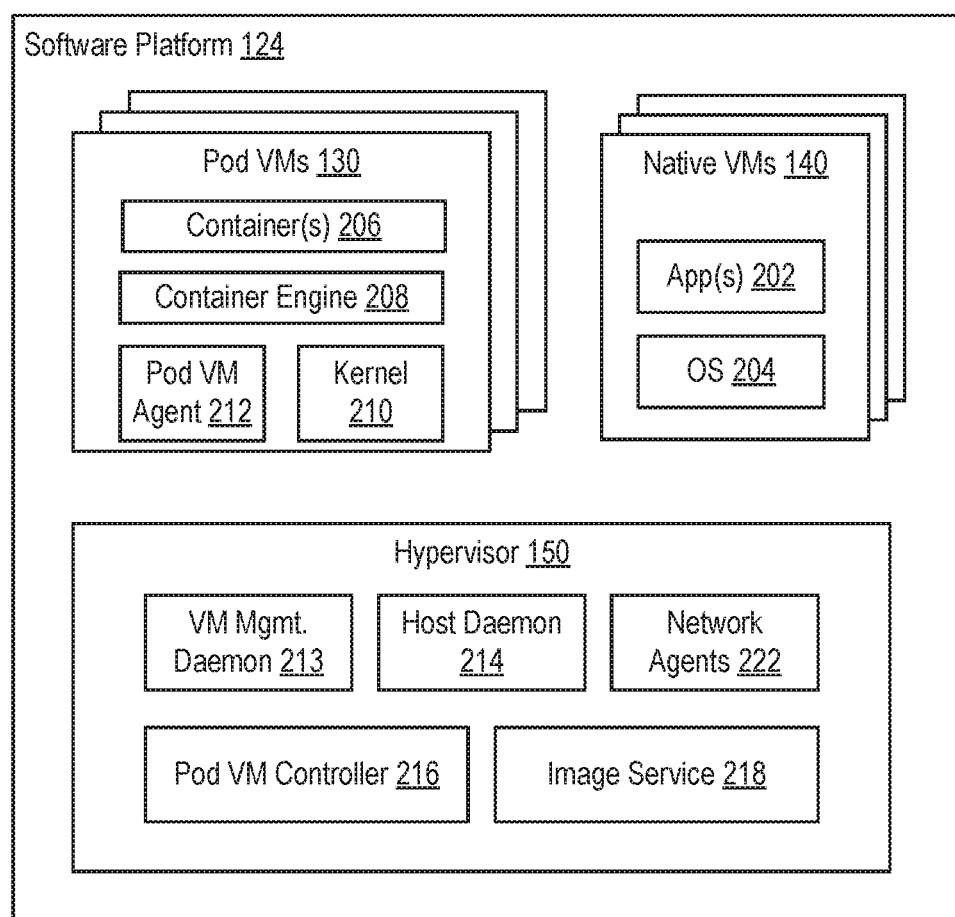
FIG. 2 is a block diagram depicting software platform according an embodiment.

FIG. 2 is a block diagram depicting software platform 124 according an embodiment. As described above, software platform 124 of host 120 includes hypervisor 150 that supports execution of VMs, such as pod VMs 130 and native VMs 140. In an embodiment, hypervisor 150 includes a VM management daemon 213, a host daemon 214, a pod VM controller 216, an image service 218, and network agents 222. VM management daemon 213 is a control plane agent 152 installed by virtualization management server 116. VM management daemon 213 provides an interface to host daemon 214 for virtualization management server 116. Host daemon 214 is configured to create, configure, and remove VMs (e.g., pod VMs 130 and native VMs 140).

Pod VM controller 216 is a control plane agent 152 of orchestration control plane 115 for supervisor cluster 101 and allows supervisor Kubernetes master 104 to interact with hypervisor 150. Pod VM controller 216 configures the respective host as a node in supervisor cluster 101. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured. Pod VM controller 216 is omitted if host cluster 118 is not enabled as a supervisor cluster 101.

Image service 218 is configured to pull container images from image registry 190 and store them in shared storage 170 such that the container images can be mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images. Image service 218 communicates with pod VM controller 216 during spin-up and configuration of pod VMs 130. In some embodiments, image service 218 is part of pod VM controller 216.

Network agents 222 comprises control plane agents 152 installed by network manager 112. Network agents 222 are configured to cooperate with network manager 112 to implement logical network services. Network agents 222 configure the respective host as a transport node in a cluster 103 of transport nodes.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux® kernel). Each native VM 140 has applications 202 running therein on top of an OS 204. Native VMs 140 do not include pod VM agents and are isolated from pod VM controller 216. Container engine 208 can be an industry-standard container engine, such as libcontainer, runc, or containerd. Pod VMs 130 are omitted if host cluster 118 is not enabled as a supervisor cluster 101.

Figure 3:
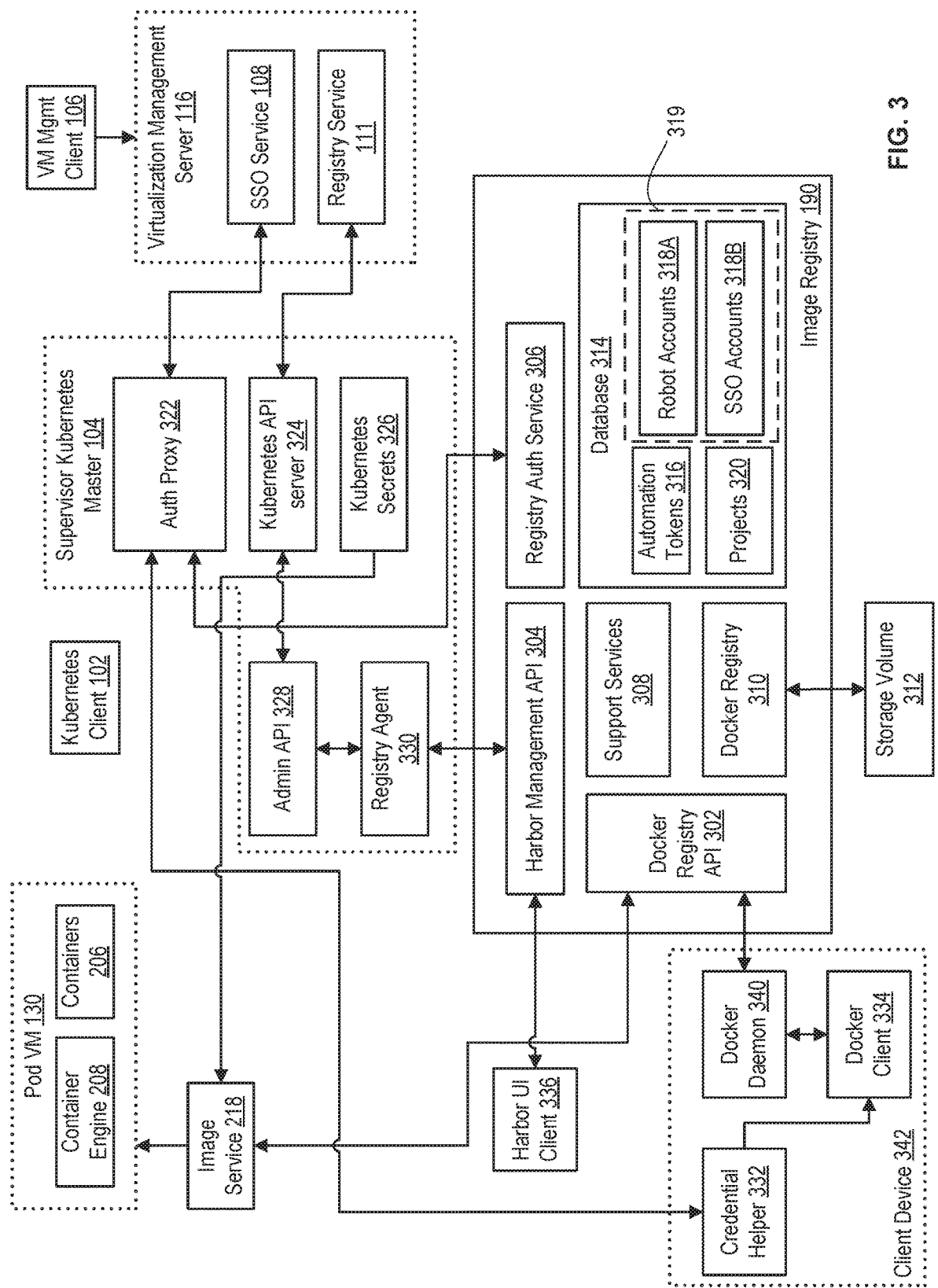
FIG. 3 is a block diagram depicting a logical relationship of components in a virtualized computing system with respect to image registry access, authentication, and authorization according to an embodiment.

FIG. 3 is a block diagram depicting a logical relationship of components in virtualized computing system 100 with respect to image registry access, authentication, and authorization according to an embodiment. In embodiments, image registry 190 comprises a Harbor registry. Harbor is an open-source container image registry that secures images with role-based access control, scans, images for vulnerabilities, and signs images as trusted. While Harbor is described in the embodiments, other image registries configured the same or similar to that shown in FIG. 3 can be employed. In embodiments, image registry 190 encapsulates a Docker® registry. A Docker registry is an image registry configured to store and manage Docker images, which are templates for deploying containers in the Docker container engine. While Docker is described in the embodiments, other image registries and container engines configured the same or similar to that shown in FIG. 3 can be employed.

Image registry 190 includes a Docker registry API 302, a Harbor management API 304, a registry authentication (auth) service 306, support services 308, a Docker registry 310, and a database 314. Image registry 190 maintains state information, including automation tokens 316, robot accounts 318A, SSO accounts 318B, and projects 320. Robot accounts 318A represent automation users, and SSO accounts 318B represent SSO users managed by SSO service 108. Robot accounts 318A and SSO accounts 318B are collectively referred to as user accounts 318 or generally as members 319 of projects 320. A member 319 can be an automation user with a robot account 318A, or an SSO user with an SSO account 318B. Image registry 190 does not store credentials for SSO accounts 318B, which are instead maintained by the SSO platform in virtualized computing system 100 (e.g., SSO service 108).

By way of example, the state data is shown stored in database 314. However, some or all the state data can be stored and managed by other components in image registry 190. Docker registry API 302 and Harbor management API 304 provide an interface to image registry 190. Docker registry API 302 provides an interface to clients for login to image registry 190 and, if authenticated and authorized, to push and/or pull images through Docker registry 310. Harbor management API 304 provides an interface to clients for management of image registry 190, including configuration of security policy, add/remove users in projects, add/remove projects, system configurations, and the like. Docker registry 310 is the central component that stores and maintains images in storage volume 312. Support services 308 include extended service components, such as image scanning, image signing, image replication, and the like. Database 314 stores metadata and/or state data for image registry 190. Registry auth service 306 is configured to perform authentication and authorization checks based on user identities and roles, as described further herein. Registry auth service 306 comprises at least a portion of credential manager 123.

The remaining portion of cluster image registry 121 includes registry service 111 and a registry agent 330. In embodiments, registry service 111 is deployed in virtualization management server 116 along with SSO service 108 as described above. Registry service 111 can deploy a registry agent 330. Registry service 111 invokes an admin API 328 of registry agent 330 to deploy image registry 190. Registry service 111 also invokes admin API 328 of registry agent 330 to perform configuration and management of image registry 190 through Harbor management API 304. That is, registry service 111 invokes admin API 328 of registry agent 330, and registry agent 330 invokes Harbor management API 304 for configuration and management of image registry 190.

In embodiments, image registry 190 and registry agent 330 are deployed in VMs (e.g., as containers in pod VMs 130). Registry agent 330 can be an extension of a Kubernetes API server 324. Kubernetes provides two mechanisms for extending the Kubernetes API. A first mechanism involves adding an extension API to the Kubernetes API, registering the extension API with an aggregation layer that proxies for calls to the extension API, and an API extension server that receives the extension API calls from the aggregation layer. The API extension server includes custom controllers for managing lifecycles of the API extension objects. A second mechanism involves adding a custom API to the Kubernetes API that manage custom resources defined using custom resource definitions (CRDs) and supplying custom controllers that manage the lifecycles of the custom resources.

In embodiments, admin API 328 is an extension API of Kubernetes API server 324, and registry agent 330 is an extension API server. As discussed further herein, virtualized computing system 100 can include a management network and a VM network, where the management network is isolated from the VM network. Virtualization management server 116 and supervisor Kubernetes master 104 are connected to the management network. VMs implementing the registry agent 330 (as an API extension server) and image registry 190 are connected to the VM network. Supervisor Kubernetes master 104 is also connected to the VM network. In such case, supervisor Kubernetes master 104 provides the proxy to enable communication between registry service 111 and registry agent 330. Registry service 111 invokes admin API 328 as extension APIs in Kubernetes API server 324, and registry agent 330 handles the invocations of admin API 328 as an extension API server. In other embodiments, admin API 328 is a custom API of Kubernetes API server 324, and registry agent 330 includes controllers in supervisor Kubernetes master 104. Registry service 111 interacts with registry agent 330 through calls to admin API 328 as a custom API in Kubernetes API master 324. Registry agent 330 in turn invokes Harbor management API 304. In cases where host cluster 118 is not enabled as a supervisor cluster, admin API 328 and registry agent 330 can be deployed in a VM 140 that is connected to both the management network and the VM network, which would enable direct communication between registry service 111 and registry agent 330 through admin API 328.

In embodiments, a user can access Harbor management API 304 through a Harbor UI client 336. Harbor management API 304 can limit access to viewing status of image registry 190 through Harbor UI client 336. Management and configuration APIs of Harbor management API 304 are invoked by register service 111, as described above, and thus not accessible through Harbor UI client 336.

In embodiments, there are three use cases requiring authentication and authorization: (1) A developer may login to image registry 190 as an SSO user through a Docker client 334 to pull/push images; (2) A developer may login as an SSO user to supervisor Kubernetes master 104 via Kubernetes client 102 and deploy pod VM(s), which triggers pull access on image registry 190 via image service 218; and (3) An automation service associated with a service account in Kubernetes master 104 deploys pod VM(s), which triggers pull access on image registry 190 via image service 218. These three authentication/authorization paths are illustrated in FIG. 3.

For the first use case, Docker client 334 accesses image registry 190 through a Docker daemon 340, which calls API(s) on Docker registry API 302. Docker client 334 does not login to image registry 190 using SSO credentials (e.g., username and password of an SSO user). Rather, the SSO user executes credential helper 332 to obtain a session token from SSO service 108. Credential helper 332 provides the session token to Docker client 334 (or stores the session token for access by Docker client 334). Docker client 334 sends an image request through Docker daemon 340 to image registry 190, where the image request includes the session token for the SSO user. In embodiments, virtualization management server 116, in which SSO service 108 is deployed, is not directly accessible by credential helper 332. Rather, credential helper 332 cooperates with an auth proxy 322 in supervisor Kubernetes master 104, which in turn cooperates with SSO service 108. Auth proxy 322 comprises a second component of credential manager 123. An SSO user provides their SSO user credentials to credential helper 332, which does not store or cache the SSO user credentials. Credential helper 332 provides the SSO credentials to auth proxy 322, which uses the SSO credentials to obtain a session token from SSO service 108. SSO service 108 determines authenticity of the SSO user based on the SSO credentials. Upon receiving an image request from Docker client 334 using the session token, registry auth service 306 authenticates and authorizes the SSO user. For authentication, registry auth service 306 cooperates with auth proxy 322 to validate the session token. Registry auth service 306 then authorizes the SSO user and returns a bearer token to Docker client 334, which uses the bearer token to perform the image push or pull.

For the second use case, an SSO user logs into supervisor Kubernetes master 104 through Kubernetes client 102 using their SSO credentials. Auth proxy 322 cooperates with SSO service 108 to authenticate the SSO user. Kubernetes API server 324 authorizes the SSO user for operations, e.g., deployment of a pod VM 130 in a supervisor namespace in which the SSO user is authorized. The supervisor namespace is associated with one or more projects 320 (e.g., a public project for supervisor cluster 101 as a whole and a private project for supervisor namespace). Image registry 190 includes a robot account associated with each project 320 that has pull permission. The credentials of each robot account 318A are embodied by a respective automation token 316. Supervisor Kubernetes master 104 maintains Kubernetes secrets 326, one for each project in the supervisor namespace. Each Kubernetes secret 326 includes an automation token 316 for a project (e.g., the private project for the supervisor namespace). Supervisor Kubernetes master 104 directs pod VM controller 216 to configure a pod VM 130, providing a Kubernetes secret 326 for image pull. Pod VM controller 216 provides the image pull secret to image service 218, which sends an image request to image registry 190 using a respective automation token 316 for a robot account 318A extracted from the image pull secret. Registry auth service 306 authenticates and authorizes the image request, returning a bearer token to image service 218. Image service 218 uses the bearer token to pull the image(s) needed for pod VM 130. The same process is employed in the third use case involving an automation service in supervisor Kubernetes master 104. However, the automation service is not an SSO user, but rather backed by a service account deployed in supervisor Kubernetes® master. However, the service account can be created by an SSO user.

Hence, the resulting image pull is still gated by authentication/authorization of an SSO user at supervisor Kubernetes master 104.

Figure 4:
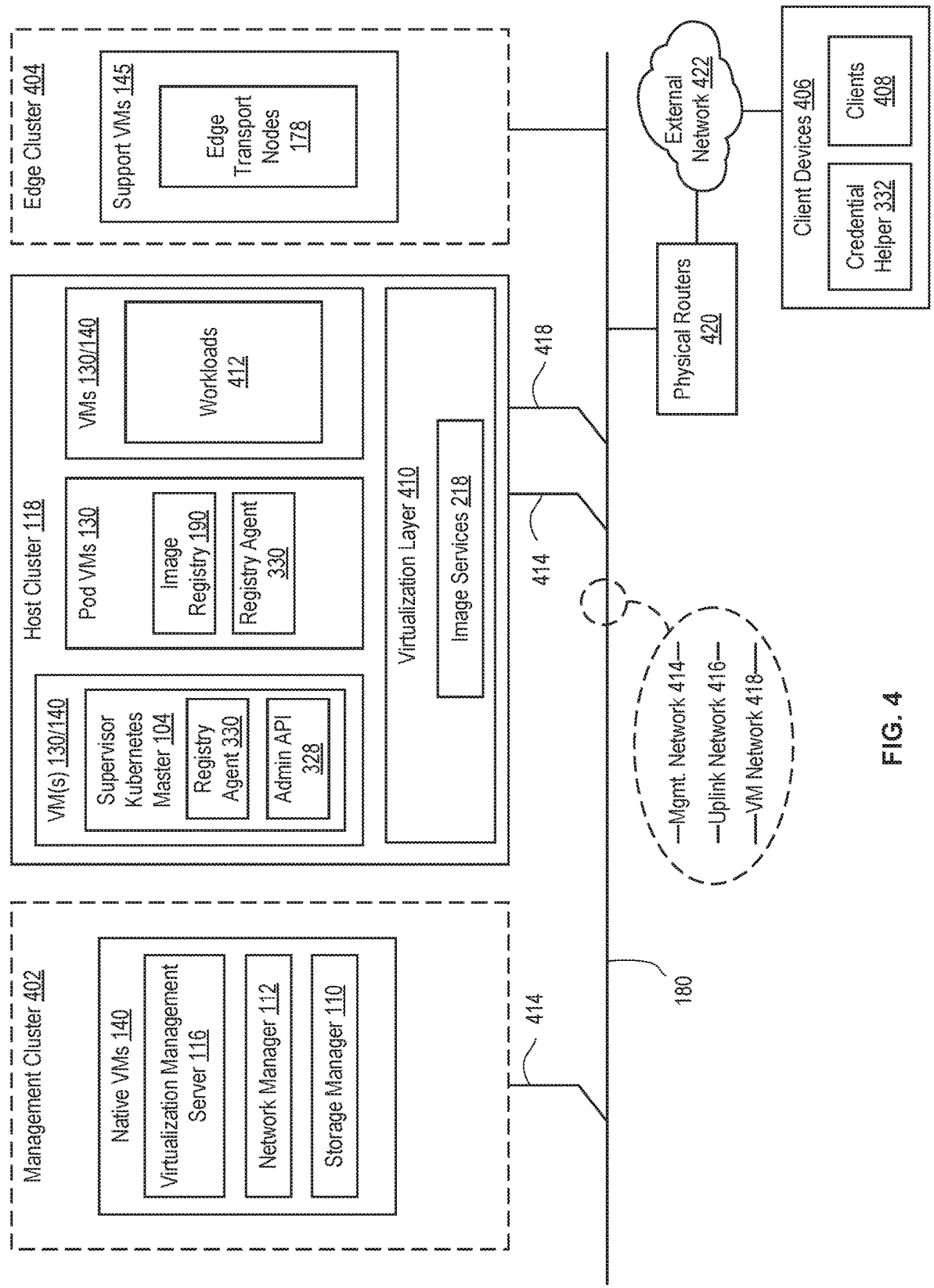
FIG. 4 is a block diagram depicting an implementation of a virtualized computing system according to an embodiment.

FIG. 4 is a block diagram depicting an implementation of virtualized computing system 100 according to an embodiment. In the example of FIG. 4, virtualization management server 116, network manager 112, and storage manager 110 are implemented in native VMs 140 of a management cluster 402. Management cluster 402 is a logical cluster of the VI control plane components. Management cluster 402 can be implemented in host cluster 118 or in a separate host cluster. Edge transport nodes 178 are implemented as native VMs (e.g., support VMs 145) in an edge cluster 404. Edge cluster 404 is a logical cluster similar to management cluster 402. Edge cluster 404 can be implemented in host cluster 118 or in a separate host cluster.

Host cluster 118 includes one or more VMs 130/140 that implement supervisor Kubernetes master 104 (or a cluster thereof). Registry agent 330 and admin API 328 execute on one of supervisor Kubernetes master 104. Image registry 190 executes as one or more services on one or more pod VMs 130. Additional VMs 130/140 execute workloads 412. A virtualization layer 410 of host cluster 118 (e.g., hypervisor 150 in each host 120) includes image services 218 as described above (e.g., one image service 218 per host 120). In cases where the Kubernetes API is extended using CRDs, registry agent 330 is implemented in supervisor Kubernetes master 104. In cases where host cluster 118 is not a supervisor cluster, supervisor Kubernetes master 104 is omitted and admin API 328 is implemented along with registry agent 330 in separate VM(s) 130/140.

Virtualized computing system 100 includes a plurality of isolated networks, including management network 414, uplink network 416, and VM network 418. For example, each network 414-418 can be implemented in a separate virtual local area network (VLAN) on physical network 180. Management cluster 402 is connected to management network 414. Host cluster 118 is coupled to both management network 414 and VM network 418. Edge cluster 404 is coupled to each of management network 414, uplink network 416, and VM network 418. Management network 414 carries management traffic between VI control plane 113 and control components, such as virtualization layer 410, supervisor Kubernetes master 104, and edge transport nodes 178. Uplink network 416 connects edge transport nodes 178 to physical routers 420, which provide an interface to an external network 422 (e.g., the public Internet). VMs 130/140 in host cluster 118 that connect to external network 422 do so through edge transport nodes 178. VM network 418 connects all VMs 130/140 in host cluster 118 and edge cluster 404. VM network 418 can be an overlay network that transports traffic between VMs using Layer-2 over Layer-3 tunnels. Example tunneling protocols include VXLAN and Geneve. Network manager 112 can orchestrate SD network layer 175 to provide various logical networks over VM network 418 using the tunnels. The logical networks can be connected to Tier-1 logical gateway/routers, which in turn are connected to Tier-0 gateway/routers in edge transport nodes 178. The logical networks and Tier-1 logical gateway/routers are implemented using distributed logic in virtualization layer 410.

Client devices 406 include conventional components of a computing device (e.g., CPU, memory, storage, network interfaces, input/output interfaces and devices, etc.). Client devices 406 are connected to external network 422 and execute clients 408 and credential helper 332. Clients 408 include the various clients of virtualized computing system 100 described herein, such as VM management client 106, Kubernetes client 102, Docker client 334, Harbor UI client 336, and the like. Clients 408 access their respective systems through external network 422 and edge transport nodes 178.

Figure 5:
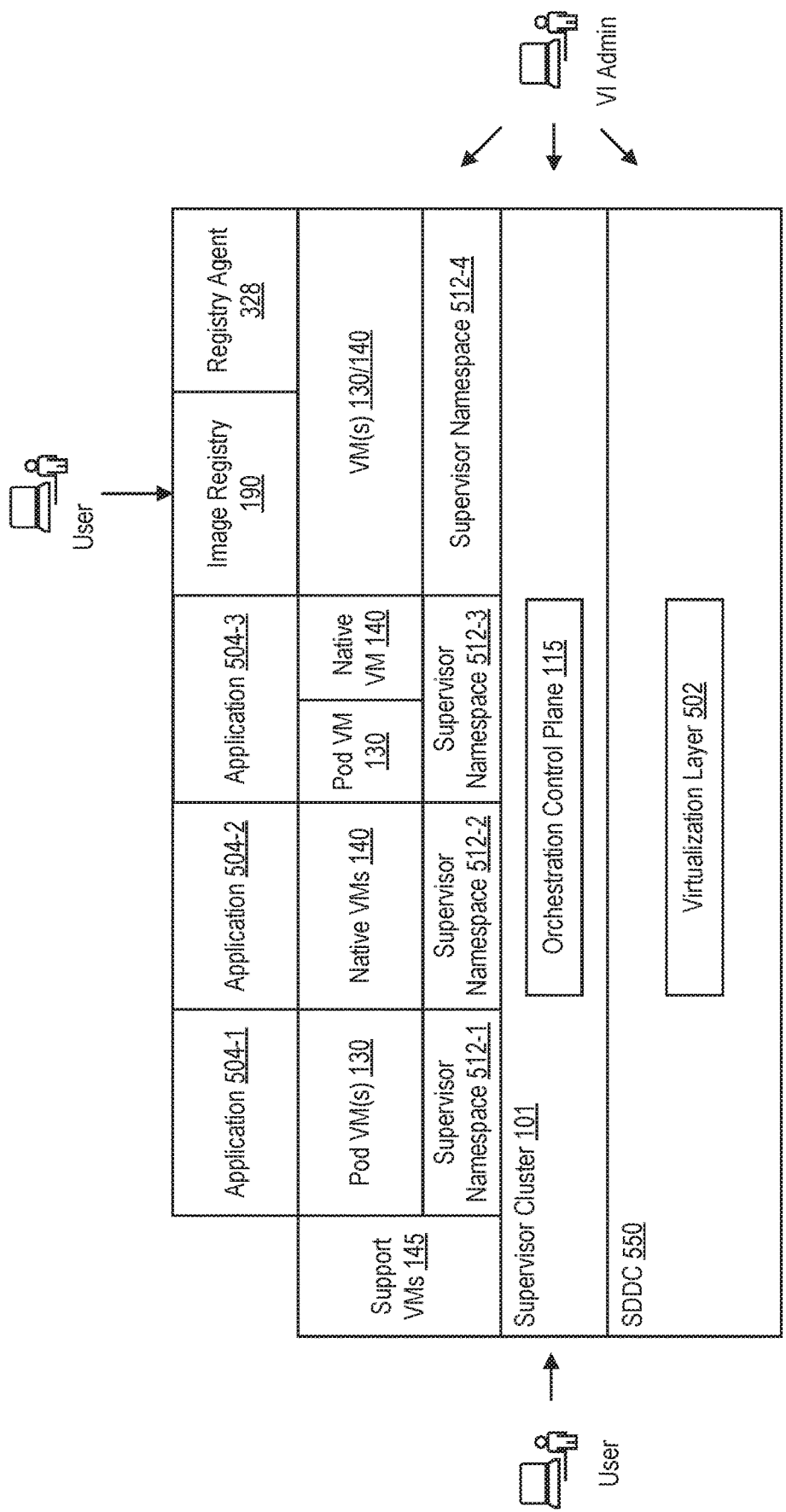
FIG. 5 is a block diagram depicting a logical view of a virtualized computing system having applications executing therein according to an embodiment.

FIG. 5 is a block diagram depicting a logical view of virtualized computing system 100 having applications executing therein according to an embodiment. In the embodiment, supervisor cluster 101 is implemented by an SDDC 350. SDDC 350 includes virtualization layer 502 (e.g., hypervisors 150 on hosts 120). A VI admin interacts with VM management server 116 to configure SDDC 350 to implement supervisor cluster 101. Supervisor cluster 101 includes orchestration control plane 115, which includes supervisor Kubernetes master(s) 104, pod VM controllers 216, and image services 218. The VI admin interacts with VM management server 116 to create supervisor namespaces 512. Each supervisor namespace 512 includes a resource pool, user-access constraints, and policies. The resource pool includes various resource constraints on supervisor namespace 512 (e.g., reservation, limits, and share (RLS) constraints). User-access constraints provide for which roles have which permissions in supervisor namespace 512 (e.g., allowing VI admin to create, manage access, allocate resources, view, and create objects; allowing DevOps to view and create objects, etc.). A user interacts with supervisor Kubernetes master 104 to deploy applications 504 on supervisor cluster 101 within scopes of supervisor namespaces 512. In the example, users deploys an application 504-1 executing on pod VMs 130 in a supervisor namespace 512-1; an application 504-2 executing on native VMs 140 in a supervisor namespace 512-2, and an application 504-3 executing on both a pod VM 130 and a native VM 140 in a supervisor namespace 512-3. A supervisor namespace 512-4 is provided to support image registry 190 and registry agent 330 (as an extension API server) executing on native VM(s) 140 and/or pod VM(s) 130. In cases where Kubernetes API is extended using CRDs, registry agent 330 can be implemented within supervisor Kubernetes master 104. A user can interact directly with image registry 190. Orchestration control plane 115 can interact with image registry 190. Support VMs 145 can include edge transport nodes, for example, to allow communication with an external network.

Figure 6:
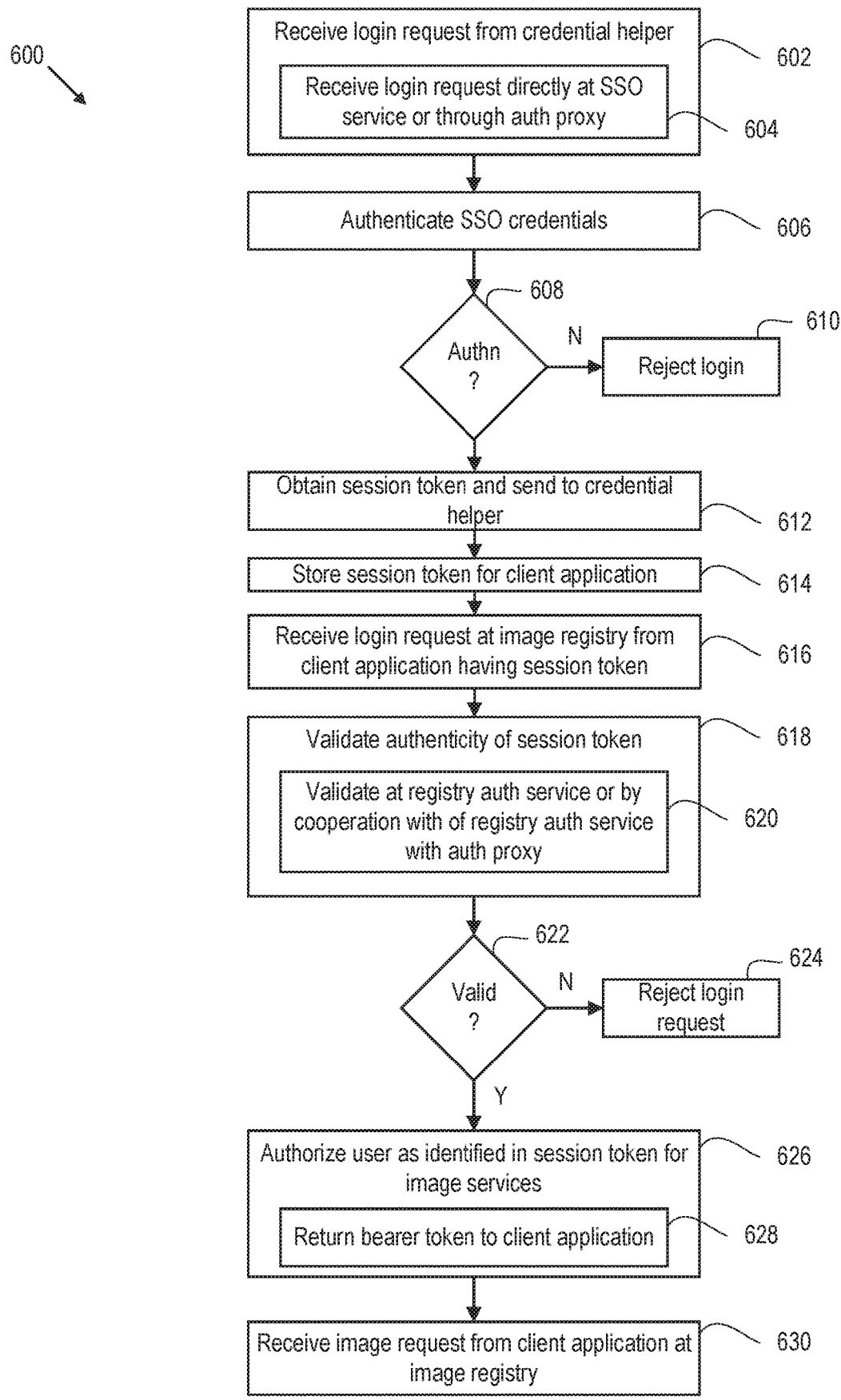
FIG. 6 is a flow diagram depicting a method of logging in a user to a container image registry in a virtualized computing system according to an embodiment.

FIG. 6 is a flow diagram depicting a method 600 of logging in a user to a container image registry in a virtualized computing system according to an embodiment. Method 600 can be performed by distributed software components executing on CPU, memory, storage, and network resources managed by a virtualization layer (e.g., a hypervisor) or a host OS. Method 600 can be performed by virtualized computing system 100 to login an SSO user to image registry 190 for image pull or image push/pull access. Thus, an SSO user can pull images from image registry 190 and/or push new/modified images to image registry 190. Image registry 190 can be integrated with a host cluster 118, which can optionally be enabled as a supervisor cluster 101.

Method 600 begins at step 602, where virtualized computing system 100 receives a login request from credential helper 332. The login request includes SSO credentials (e.g., username and password) of an SSO user managed by an SSO platform executing in virtualized computing system 100. The login request from credential helper 332 can be received directly at SSO service 108 in virtualization management server 116 or at credential manager 123 (604). For example, credential helper 332 send the login request to auth proxy 322, which in turn cooperates with SSO service 108 (e.g., in case host cluster 118 is a supervisor cluster 101). At step 606, SSO service 108 authenticates the user using the SSO credentials. At step 608, SSO service 108 determines if the SSO credentials are authentic. If not, method 600 proceeds to step 610, where SSO service 108 (potentially through auth proxy 322) rejects the login request. If the SSO credentials are authentic, method 600 proceeds to step 612, where virtualized computing system 100 sends a session token to credential helper 332. Credential helper 332 receives session token either directly from SSO service 108 or through credential manager 123 (e.g., from auth proxy 322). At step 614, credential helper 332 stores the session token for access by the client application (e.g., Docker client 334).

At step 616, image registry 190 receives a login request for image access from a client application (e.g., Docker client 334). The login request includes a session token for the user. At step 618, credential manager 123 validates the authenticity of the session token. The mechanism for validation depends on the structure of credential manager 123. In embodiments, credential manager 123 includes registry auth service 306 in image registry 190 that is capable of communicating with SSO service 108 to validate the session token. In other embodiments, credential manager 123 includes both registry auth service 306 and auth proxy 322. Registry auth service 306 cooperates with auth proxy 322 to validate the session token. Thus, at step 620, registry auth service 306 performs the validation directly with SSO service 108, or with auth proxy 322. At step 622, credential manager 123 determines if the session toke is valid. If not, method 600 proceeds to step 624 and credential manager 123 (e.g., registry auth service 306) rejects the login request.

Otherwise, method 600 proceeds to step 626, where credential manager 123 authorizes the user as identified in the session token for image services. In embodiments, registry auth service 306 performs user authorization on behalf of image registry 190. Registry auth service 306 determines the privileges assigned to the user using role-based access control (RBAC). A user can have image pull privilege or both image pull and image push privilege. Registry auth service 306 generates a bearer token encapsulating the user's privileges. At step 628, credential manager 123 (e.g., registry auth service 306) returns a bearer token to the client application (e.g., Docker client 334). At step 630, image registry 190 receives an image request from the client application (e.g., Docker client 334) for image push or pull access as granted by the bearer token.

Figure 7:
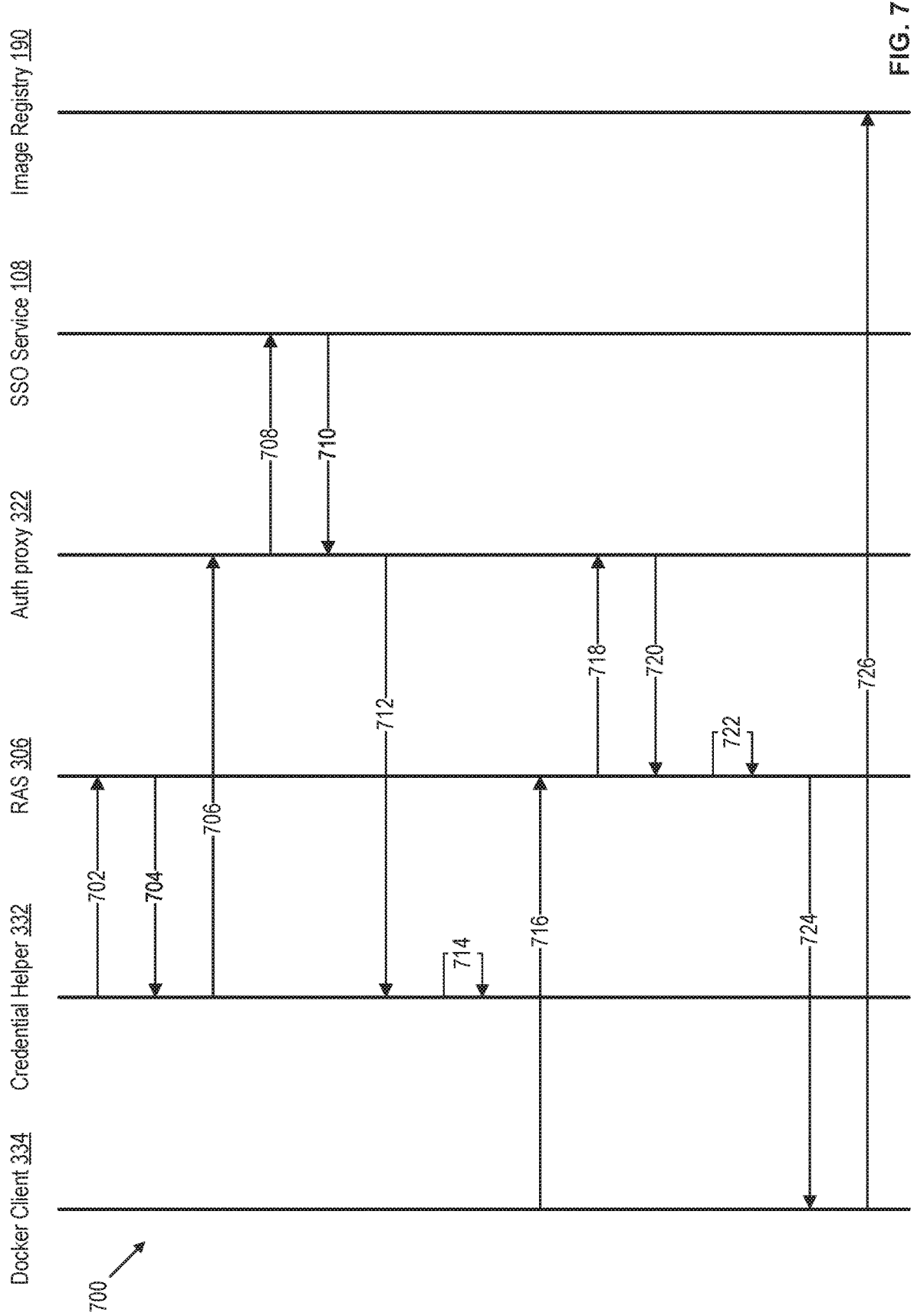
FIG. 7 is a swim lane diagram depicting a method of messaging between components of a virtualized computing system for user login to a container image registry according to an embodiment.

FIG. 7 is a swim lane diagram depicting a method 700 of messaging between components of virtualized computing system 100 for user login to a container image registry according to an embodiment. Method 700 begins at step 702, where credential helper 332 communicates with registry auth service 306 (RAS 306) to obtain an authentication endpoint used by image registry 190 for authenticating SSO users. At step 704, registry auth service 306 identifies auth proxy 322 to credential helper 332 as the authentication endpoint. At step 706, credential helper 332 sends a login request to auth proxy 322 having SSO user credentials. At step 708, auth proxy 322 sends the SSO credentials to SSO service 108 for authentication. At step 710, SSO service 108 returns a session token to auth proxy 322 (if SSO credentials were authentic). At step 712, auth proxy 322 forwards the session token to credential helper 332. At step 714, credential helper 332 configures Docker client 334 to use the session token for login to image registry 190 (e.g., username: token-user; password: the session token). At step 716, Docker client 334 sends a login request for image services registry auth service 306. At step 718, registry auth service 306 validates the session token in the login request with auth proxy 322. At step 720, auth proxy 322 returns the authentication status and user information. At step 722, registry auth service 306 authorizes the user for image access based on RBAC (e.g., pull or push/pull access) and generates a bearer token accordingly. At step 724, registry auth service 306 returns the bearer token to Docker client 334. At step 726, Docker client 334 sends an image request to image registry 190 for image service (e.g., pull or push) using the bearer token.

Figure 8:
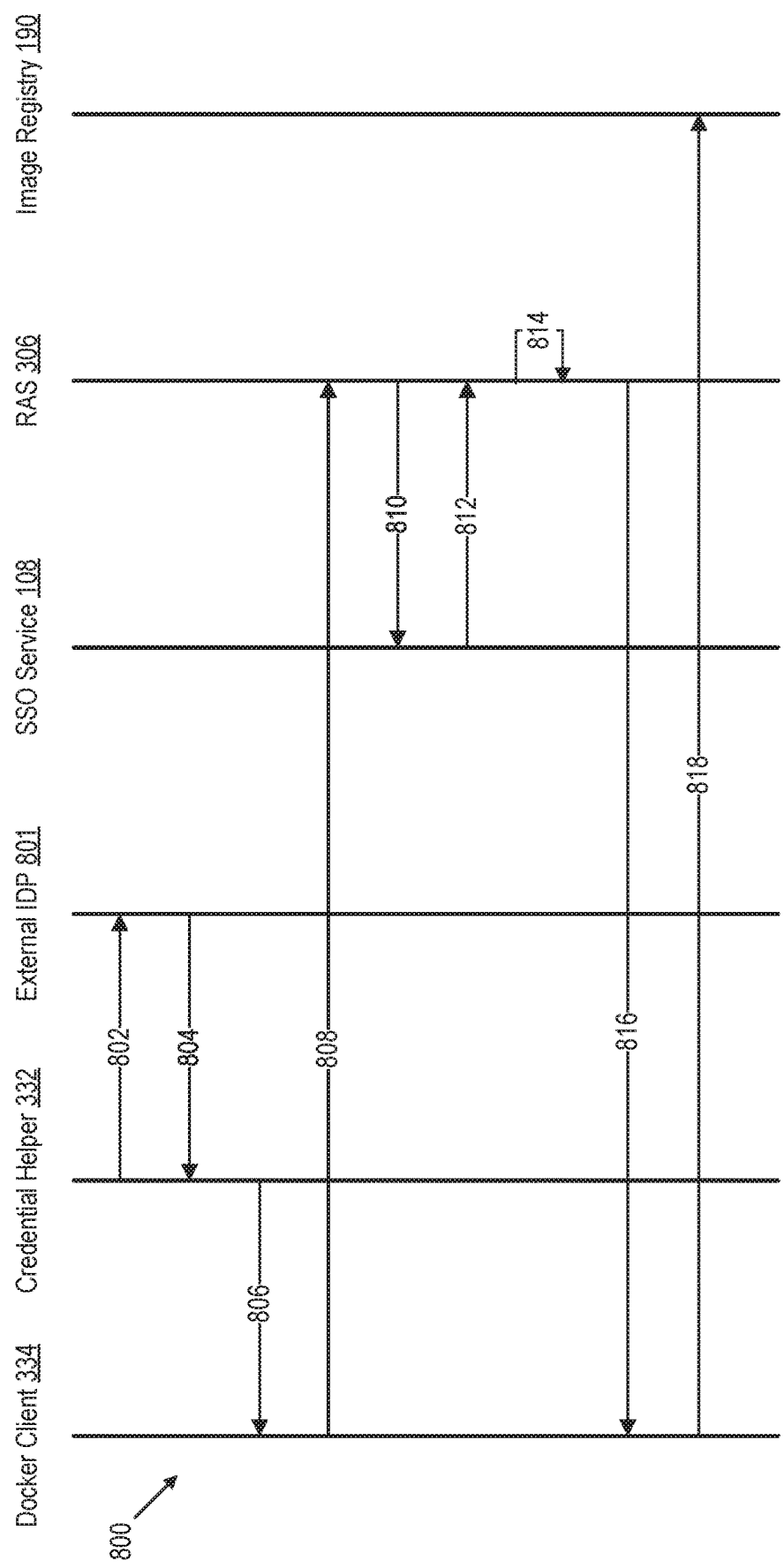
FIG. 8 is a swim lane diagram depicting a method of messaging between components of a virtualized computing system for user login to a container image registry according to another embodiment.

FIG. 8 is a swim lane diagram depicting a method 800 of messaging between components of virtualized computing system 100 for user login to a container image registry according to another embodiment. Method 800 makes use of an external identity provider (IDP) 801. Method 800 begins at step 802, where credential helper 332 sends a logic request to external IDP 801. The login request can include SSO credentials of an SSO user. At step 804, external IDP 801 returns an access token to credential helper 332. For example, external IDP 801 can return an access token having a first format, such as a JWT. At step 806, credential helper 332 configures Docker client 334 to use the access token for image access. At step 808, Docker client 334 sends a login request to registry auth service 306. The login request includes the access token from external IDP 801. At step 810, registry auth service 306 cooperates with SSO service 108 to exchange the access token for a session token. The session token can have a different format than the access token (e.g., SAML token). SSO service 108 validates the access token before granting the session token. At step 812, SSO service 108 returns the session token to registry auth service 306. At step 814, registry auth service 306 authorizes the user identified in the session token based on RBAC (e.g., pull or push/pull access) and generates a bearer token accordingly. At step 816, registry auth service 306 returns a bearer token to Docker client 334. At step 818, Docker client 334 sends an image request to image registry 190 for image service (e.g., pull or push) using the bearer token.

Figure 9:
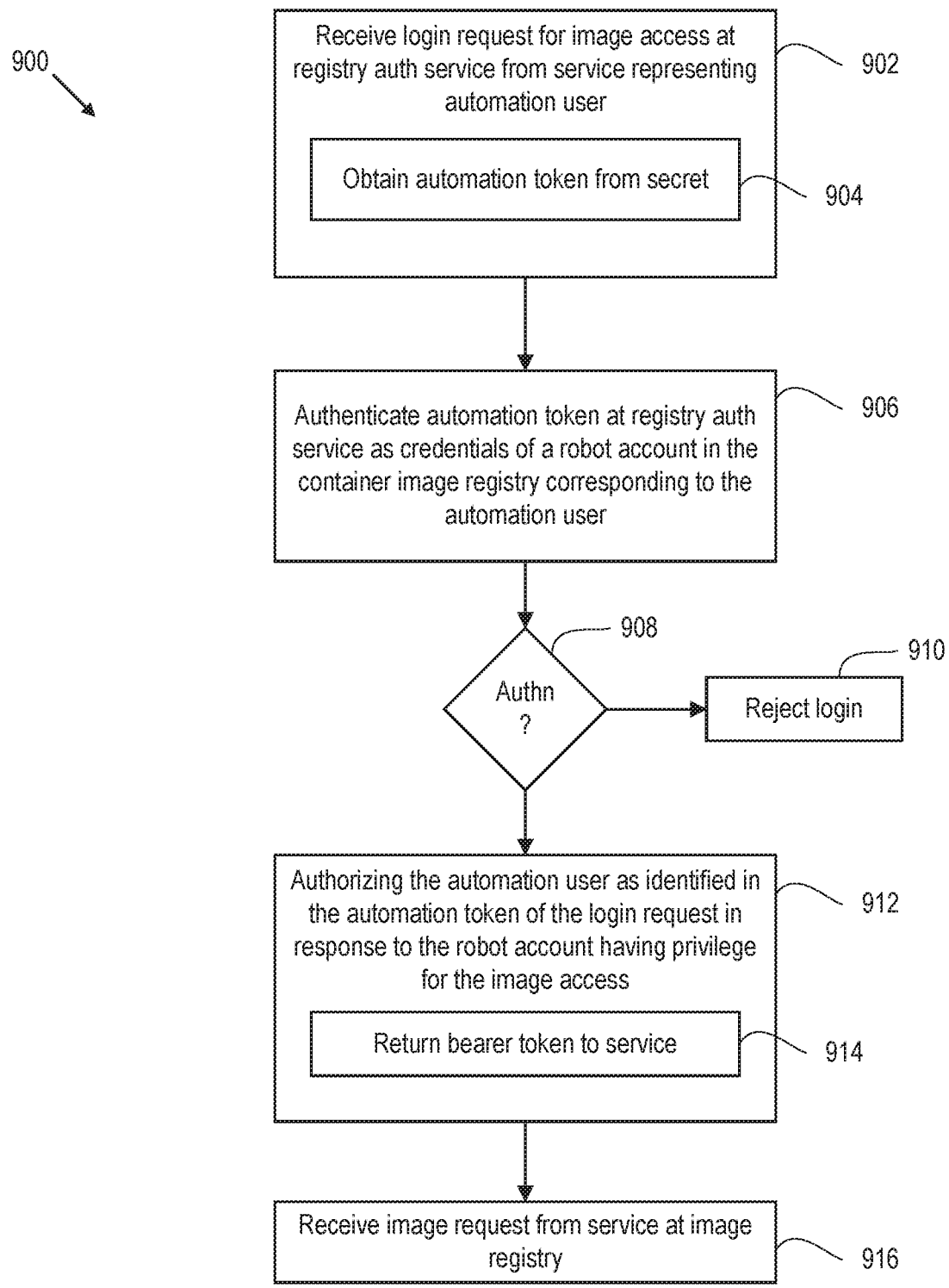
FIG. 9 is a flow diagram depicting a method of logging in an automation user to a container image registry in a virtualized computing system according to an embodiment.

FIG. 9 is a flow diagram depicting a method of logging in an automation user to a container image registry in a virtualized computing system according to an embodiment. Method 900 can be performed by distributed software components executing on CPU, memory, storage, and network resources managed by a virtualization layer (e.g., a hypervisor) or a host OS. Method 900 can be performed by virtualized computing system 100 to login a service (e.g., image service 218) representing an automation user to image registry 190 for image pull access. Thus, a service can pull images from image registry 190. Image registry 190 can be integrated with a host cluster 118, which can optionally be enabled as a supervisor cluster 101.

Method 900 begins at step 902, where registry auth service 306 receives a login request for image access from a service representing an automation user. In embodiments, image service 218 represents an automation user in the virtualization layer of supervisor cluster 101. Image service 218 pulls images in response to pod deployment operations directed by supervisor Kubernetes master 104. Pod deployment operations can be initiated directly by an SSO user, or automatically by a service account instantiated by an SSO user. Image registry 190 manages a robot account representing the automation user. The credentials of the robot account are stored in an automation token. The login request received at registry auth service 306 includes the automation token. In an embodiment, the service (e.g., image service 218) obtains the automation token from a secret provided by supervisor Kubernetes master 104. The secret can be associated with a project. The project and the secret can be objects in a supervisor namespace. The robot account is associated with the project in image registry 190.

At step 906, registry auth service 306 authenticates the automation token as credentials of the robot account in image registry 190 corresponding to the automation user. At step 908, registry auth service 306 determines with the automation token is authentic. If not, method 900 proceeds to step 910, where the login is rejected. Otherwise, method 900 proceeds to step 912. At step 912, registry auth service 306 authorizes the automation user as identified in the automation token of the login request in response to the robot account having privilege for the image access (e.g., an image pull). Registry auth service 306 generates a bearer token encapsulating the automation user's privileges. At step 914, registry auth service 306 returns a bearer token to the service (e.g., image service 218). At step 916, image registry 190 receives an image request from the service (e.g., image service 218) for image pull access as granted by the bearer token.

Figure 10:
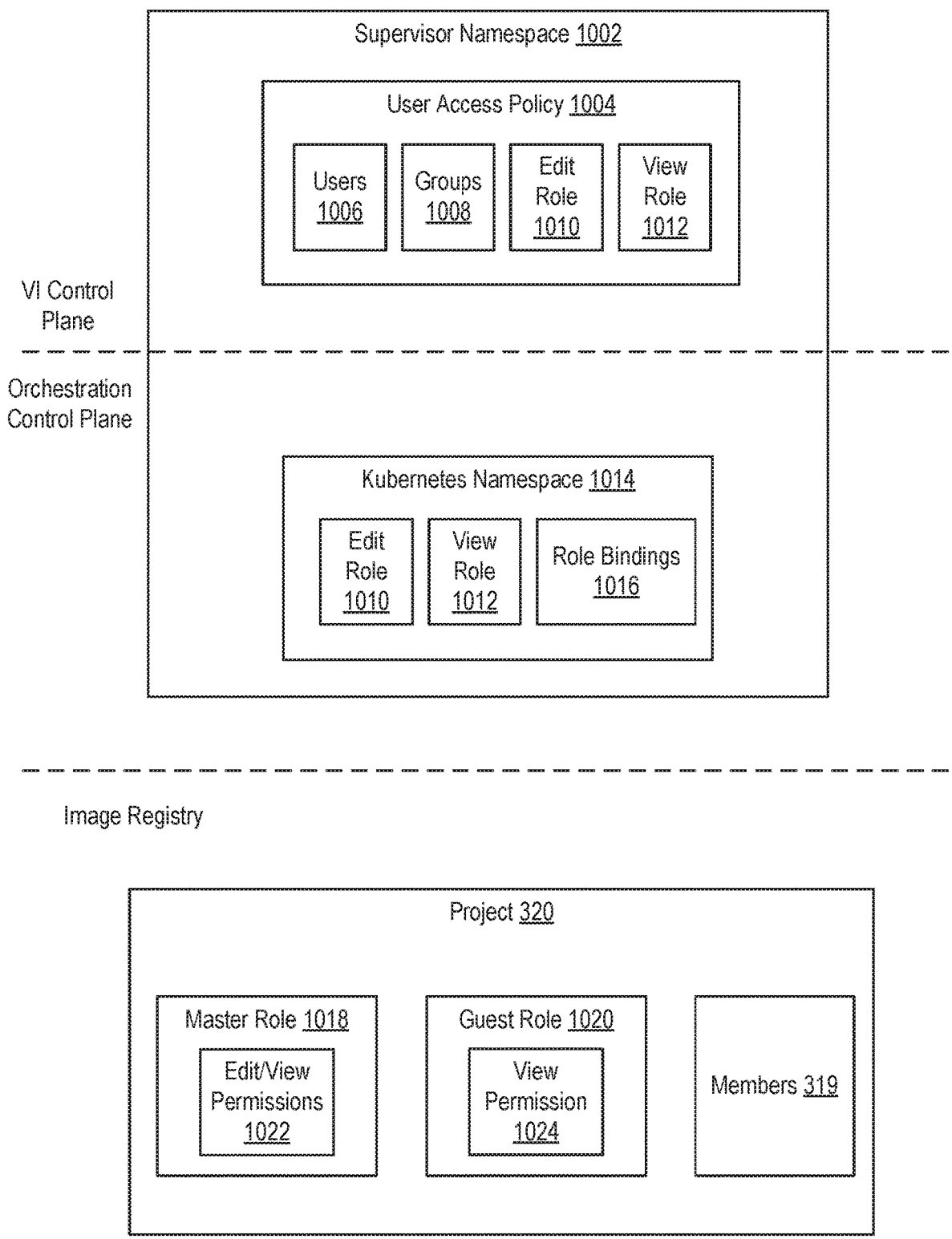
FIG. 10 is a block diagram depicting a logical relation between objects in a VI control plane, an orchestration control plane, and an image registry according to an embodiment.

FIG. 10 is a block diagram depicting a logical relation between objects in a VI control plane, an orchestration control plane, and an image registry according to an embodiment. A user interacts with VI control plane 113 (e.g., virtualization management server 116) to define a supervisor namespace 1002 (also generally referred to as a "namespace"). The user interacts with the VI control plane 113 to define a user access policy 1004 for supervisor namespace 1002. User access policy 1004 includes relations between users/groups 1006/1008 and namespace roles, which include an edit role 1010 and a view role 1012. Users are SSO users managed by SSO service 108. A user can interact with virtualization management server 116 to further define groups of SSO users. A user can interact with virtualization management server 116 to assign a namespace role to each user 1006 and to each group 1008, which in the present example is one of edit role 1010 and view role 1012. Edit role 1010 can include create, read, update, and destroy permissions for workloads in supervisor namespace 1002. View role can include read-only permission for supervisor namespace 1002. Relationships between users and groups can also be defined. For example, a user A can belong to a group 1. If group 1 has edit permission on the supervisor namespace, then the user A can push images to the corresponding project by inheriting the master role from the group. If group 1 has view permission on the supervisor namespace and the user A has edit permission on the supervisor namespace, then the user A can push images to the corresponding project since the user A has a higher privilege than the group. Note that the user specifies resource constraints, network and storage policies, and the like for supervisor namespace 1002 in addition to user access policy 1004. However, since the additional constraints/policies are not relevant to the present logical relation, they are not discussed further herein.

VI control plane 113 (e.g., virtualization management server 116) extends supervisor namespace 1002 into orchestration control plane 115 (e.g., supervisor Kubernetes master 104). Virtualization management server 116 calls Kubernetes API server 324 to create Kubernetes namespace 1014 (e.g., a native namespace of orchestration control plane 115). Kubernetes namespace 1014 includes an implementation of user access policy 1004. In particular, virtualization management server 116 calls Kubernetes API server 324 to create edit role 1010, view role 1012, and role bindings 1016. Role bindings 1016 associate subjects to roles, such as edit role 1010 and view role 1012. Subjects include users, groups, service accounts, and the like.

VI control plane 113 in cooperation with orchestration control plane 115 calls Harbor management API 304 of image registry 190 to create project 320. Project 320 is a private project dedicated to supervisor namespace 1002. In embodiments, registry service 111 in cooperation with registry agent 330 automatically creates project 320 responsive to creation of supervisor namespace 1002. Alternatively, a user can interact with virtualization management server 116 to create project 320 during creation of namespace 1002. In either case, registry service 111 is responsible for creating project 320 by calling admin API 328 of registry agent 330. Registry agent 330 in turn calls Harbor management API 304 of image registry 190. During creation of project 320, registry service 111 also invokes admin API 328 to add members 319 having associated image registry roles, which in the present embodiment include a master role 1018 and a guest role 1020. Members 319 include users and/or groups based on definition of users 1006 and groups 1008. Master role 1018 includes edit and view permissions 1022, which allow a user logged into image registry 190 push and pull image access. Guest role 1020 includes only view permission 1024, which allows a user logged into image registry 190 pull image access. Registry service 111 calls admin API 328 to assign master role 1018 to each user/group having edit role 1010 based on role bindings 1016. Registry service 111 calls admin API 328 to assign guest role 1020 to each user/group having view role 1012. Registry agent 330 operates to carry out the instruction of registry service 111.

Figure 11:
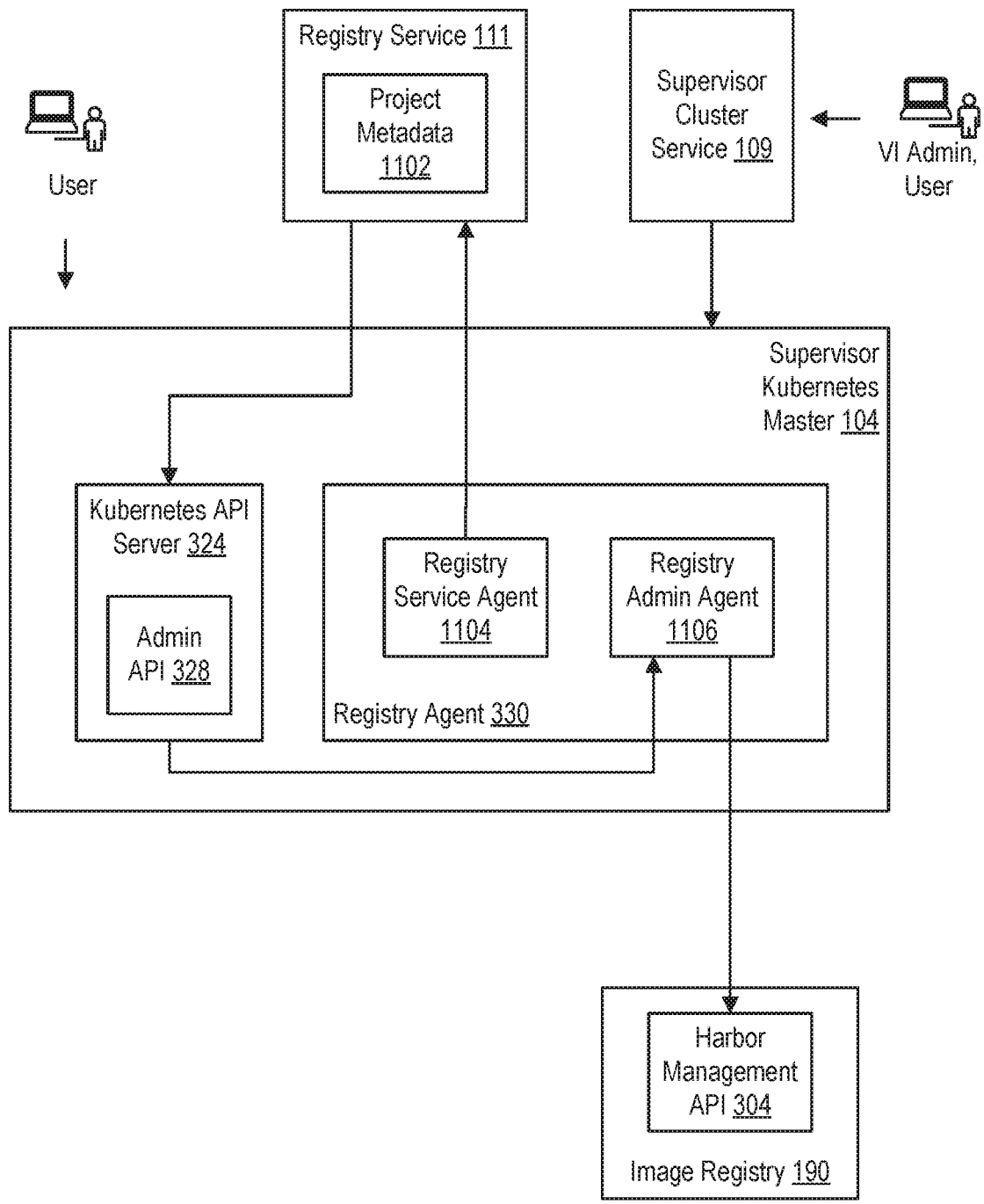
FIG. 11 is a block diagram depicting communication between a registry service, a registry agent, and an image registry according to an embodiment.

FIG. 11 is a block diagram depicting communication between a registry service, a registry agent, and an image registry according to an embodiment. In the present embodiment, registry agent 330 executes as part of supervisor Kubernetes master 104. Registry agent 330 includes a registry service agent 1104 and a registry admin agent 1106. Admin API 328 is implemented as a custom API of Kubernetes API server 324. Registry agent 330 is a custom controller configured to reconcile state by watching create/update/delete events on Kubernetes namespace 1014 and to handle calls to admin API 328. A VI admin or user interacts with supervisor cluster service 109 to define supervisor namespace 1002 as described above. Supervisor cluster service 109 configures supervisor Kubernetes master 104 with Kubernetes namespace 1014. Registry service agent 1104 detects creation of Kubernetes namespace 1014 and invokes API of registry service 111. Registry service 111 calls admin API 328 to create a project for supervisor namespace 1002. Registry admin agent 1106 calls Harbor management API 304 as instructed by the call to admin API 328 to create project 320 for supervisor namespace 1002. Registry service 111 can maintain project metadata 1102 associated with project 320.

In similar fashion, registry service agent 1104 detects creation of role bindings 1016 in Kubernetes namespace 1014 and invokes API of registry service 111. Registry service 111 calls admin API 328 to add members with assigned roles to project 320. Registry admin agent 1106 calls Harbor management API 304 as instructed by the calls to admin API 328 to create members 319 having assigned image registry roles (e.g., either master role 1018 or guest role 1020).

After supervisor namespace 1002 is created, a VI admin or user can update supervisor namespace with updated role bindings 1016 (e.g., adding a new user, adding a new group, changing the role assigned to a user/group, deleting a user, deleting a group, etc.). A user implement the role binding change by either interacting with supervisor cluster service 109 or by interacting with Kubernetes API service 324. In either case, registry service agent 1104 detects the change to role bindings 1016 and invokes API of registry service 111. Registry service 111 calls admin API 328 to update the project members and/or image registry roles for project members through registry admin agent 1106. A VI admin can interact with supervisor cluster service 109 to delete supervisor namespace 1002. Supervisor cluster service 109 interacts with Kubernetes API server 324 to delete Kubernetes namespace 1014 and the objects therein (e.g., edit role 1010, view role 1012, and role bindings 1016). Registry service agent 1104 detects deletion of Kubernetes namespace 1014 and invokes API of registry service 111. Registry service 111 calls admin API 324 to delete project 320. Registry admin agent 1106 responds to perform the deletion through Harbor management API 304.

Figure 12:
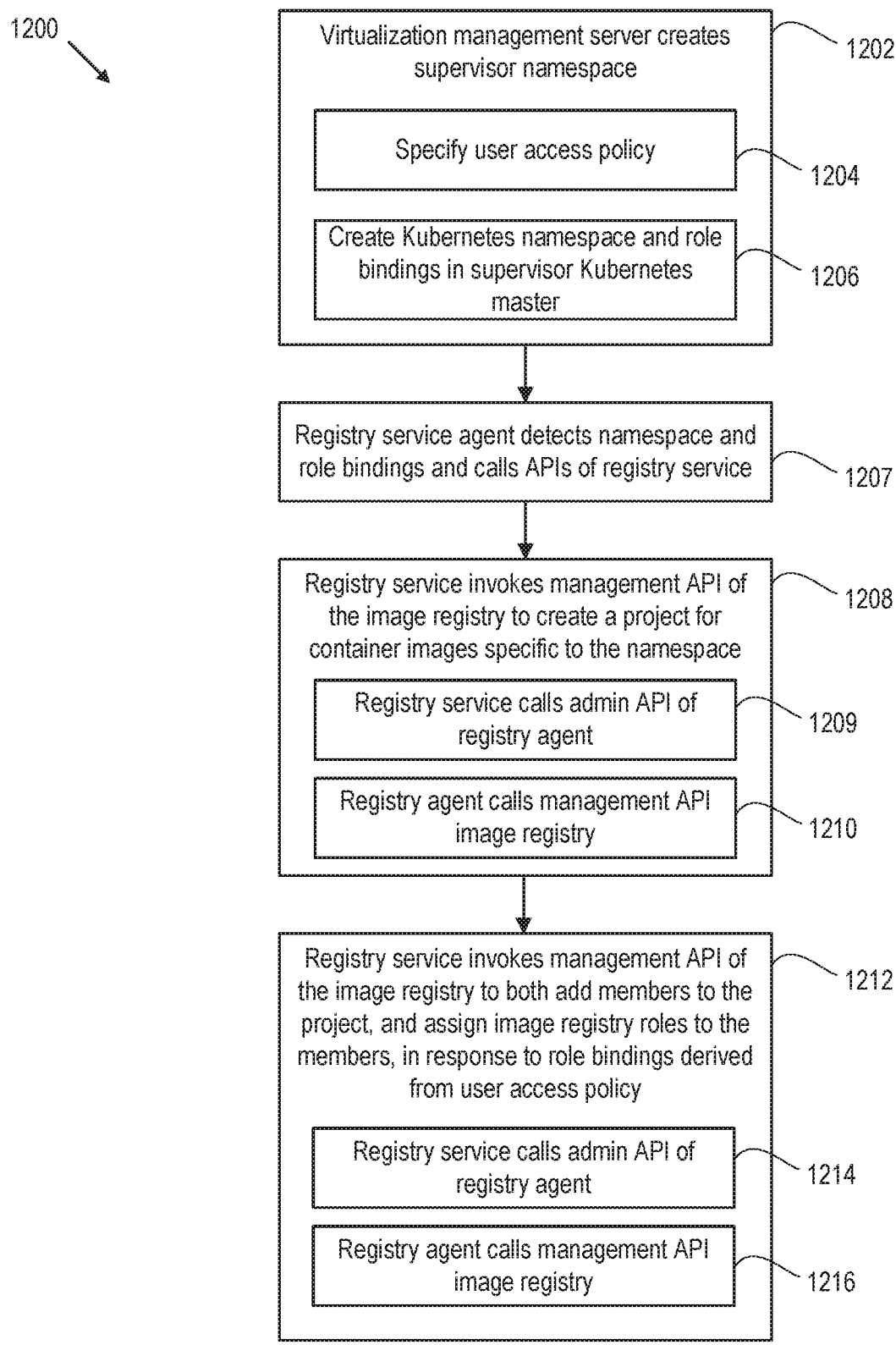
FIG. 12 is a flow diagram depicting a method of managing a container image registry in a virtualized computing system according to an embodiment.

FIG. 12 is a flow diagram depicting a method 1200 of managing a container image registry in a virtualized computing system according to an embodiment. Method 1200 can be performed by distributed software components executing on CPU, memory, storage, and network resources managed by a virtualization layer (e.g., a hypervisor) or a host OS. Method 1200 begins at step 1202, where a user interacts with virtualization management server 116 to create supervisor namespace 1002. At step 1204, a user interacts with virtualization management server 116 to specify user access policy 1004. At step 1206, supervisor cluster service 109 of virtualization management server 116 interacts with supervisor Kubernetes master 104 to create Kubernetes namespace 1014 and role bindings 1016 that implement user access policy 1004.

In an embodiment, at step 1207, registry service agent 1104 detects the new namespace and role bindings and calls APIs of registry service 111. At step 1208, registry service 111 invokes Harbor management API 304 of image registry 190 to create project 320 for container images specific to supervisor namespace 1002. For example, at step 1209, registry service 111 calls admin API 328 of registry agent 330. At step 1210, registry agent 330 in turn calls Harbor management API 304 of image registry 190 to create project 320.

At step 1212, registry service 111 invokes Harbor management API 304 to both add members 319 and assign an image registry role (e.g., master role 1018 or guest role 1020) to each member 319 based on role bindings 1016. For example, at step 1214, registry service 111 calls admin API 328 of registry agent 330. At step 1216, registry agent 330 in turn calls Harbor management API 304 of image registry 190 to add members 319 and assign an image registry role to each member 319.

In method 1200, a user interacts with virtualization management server 116 to create a supervisor namespace and then image registry 190 is updated with a new project and project members. In embodiments, when image registry 190 is deployed, one or more supervisor namespaces may already have been created prior to such deployment. In such case, new projects can be created, and new project members added, as shown in FIG. 12 for each of the existing supervisor namespaces in a batch automatically upon deployment of image registry 190.

Figure 13:
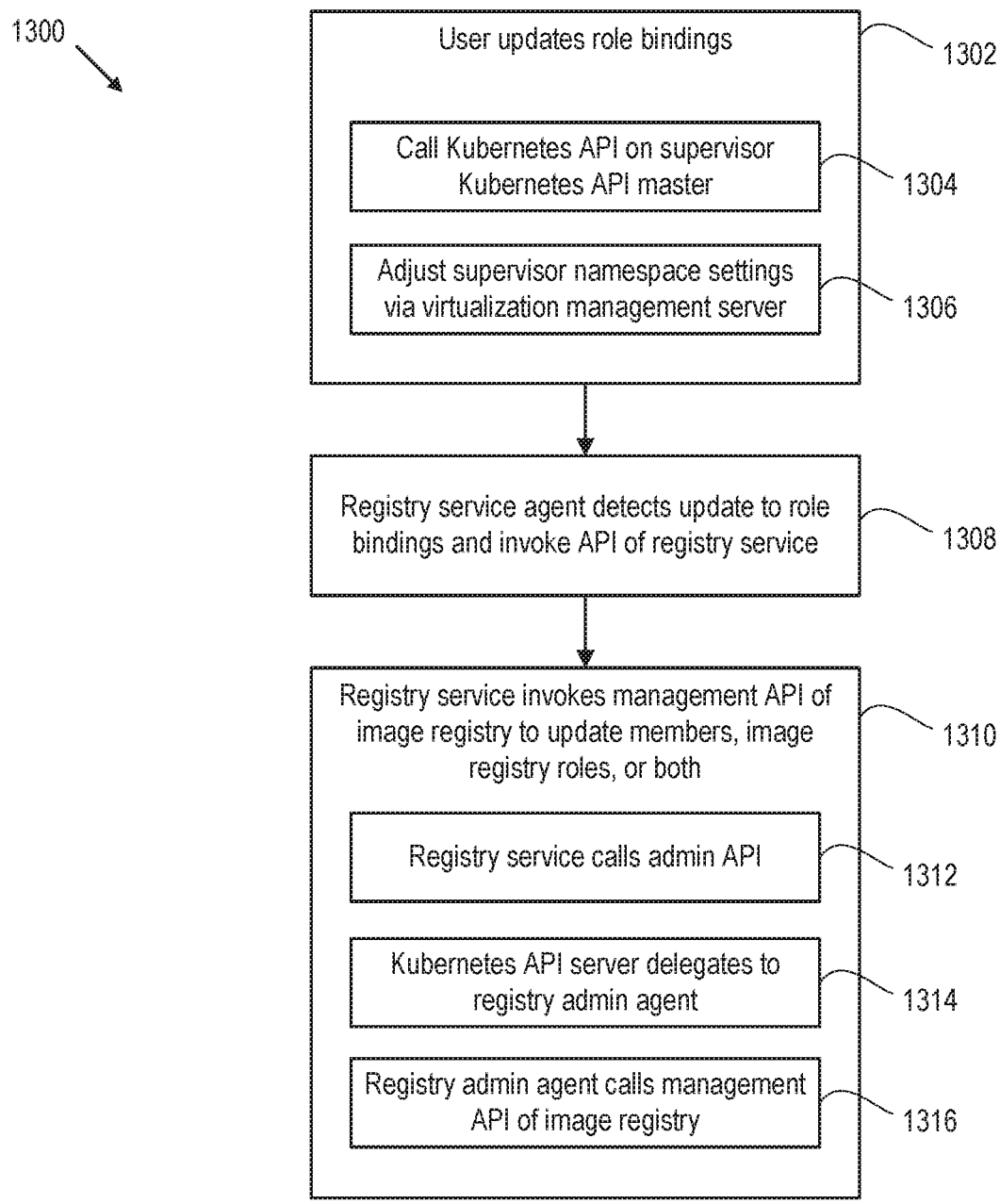
FIG. 13 is a flow diagram depicting a method of updating a container image registry in a virtualized computing system according to an embodiment.

FIG. 13 is a flow diagram depicting a method 1300 of updating a container image registry in a virtualized computing system according to an embodiment. Method 1300 can be performed by distributed software components executing on CPU, memory, storage, and network resources managed by a virtualization layer (e.g., a hypervisor) or a host OS. Method 1300 can be performed by virtualized computing system 100 as configured in FIG. 11.

Method 1300 begins at step 1302, where a user updates role bindings 1016. For example, at step 1304, a user calls Kubernetes APIs on supervisor Kubernetes master 104 to update role bindings 1016. In addition or alternatively to step 1304, at step 1306, a user interacts with virtualization management server 116 to adjust supervisor namespace settings (e.g., modify user access policy 1004). After either or both of steps 1304 and 1306, role bindings 1016 are updated. Role binding updates can include addition of new users/groups, modification of user/group permissions, deletion of user/groups, and the like.

At step 1308, registry service agent 1104 detects the update to role bindings 1016 and invokes the API of registry service 111. At step 1310, registry service 111 invokes Harbor management API 304 to update members 319, assigned image registry roles, or both based on the updated state of role bindings 1016. For example, at step 1312, registry service 111 calls admin API 328 in Kubernetes API server 324. At step 1314, Kubernetes API server 324 delegates the calls to admin API 328 to registry admin agent 1106. At step 1316, registry admin agent 1106 calls Harbor management API 304 to affect the updates to members 319, assigned image registry roles, or both. In cases where a user or group is deleted, the corresponding project member is deleted automatically.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of managing a container image registry in a virtualized computing system, the container image registry managing container images for deploying containers in a host cluster, the host cluster including hosts and a virtualization layer executing on hardware platforms of the hosts, the virtualization layer supporting execution of virtual machines (VMs), the method comprising:
    creating, by a virtualization management server managing the host cluster, a namespace for an orchestration control plane integrated with the virtualization layer, the namespace including constraints;
    invoking, by a registry service executing in the virtualization management server in response to creation of the namespace, a management application programming interface (API) of the container image registry to create a project for the container images;
    invoking, by the registry service, an administrative API (admin API) of a registry agent, the registry agent in turn invoking the management API of the container image registry to both add members to the project, and assign image registry roles to the members, in response to bindings of users and namespace roles derived from the constraints; and
    deploying workloads in the VMs within the constraints of the namespace, the workloads comprising the containers.

2. The method of claim 1, wherein the registry agent executes in a master server of the orchestration control plane.

3. The method of claim 2, further comprising:
    detecting, by the registry agent, an update to the bindings;
    invoking, by the registry agent, an API of the registry service of the update to the bindings; and
    invoking, by the registry service through the registry agent, the management API of the container image registry to update the members of the project, the image registry roles assigned to the members, or both in response to the update to the bindings.

4. The method of claim 1, wherein a master server of the orchestration control plane includes an API server having the admin API, and wherein the API server forwards calls of the admin API by the registry service to the registry agent.

5. The method of claim 4, further comprising:
    identifying, by the registry service, an update to the bindings; and
    calling, by the registry service, the admin API of the registry agent to instruct the registry agent to call the management API of the container image registry to update the members of the project, the image registry roles assigned to the members, or both in response to the update to the bindings.

6. The method of claim 1, wherein the image registry roles of the container image registry include a first role having both push and pull image access and a second role having only pull image access, and wherein an edit role of the namespace roles is mapped to the first role and a view role of the namespace roles is mapped to the second role.

7. A non-transitory computer readable medium comprising instructions to be executed in a computing device to cause the computing device to carry out a method of managing a container image registry in a virtualized computing system, the container image registry managing container images for deploying containers in a host cluster, the host cluster including hosts and a virtualization layer executing on hardware platforms of the hosts, the virtualization layer supporting execution of virtual machines (VMs), the method comprising:
    creating, by a virtualization management server managing the host cluster, a namespace for an orchestration control plane integrated with the virtualization layer, the namespace including constraints;
    invoking, by a registry service, an administrative API (admin API) of a registry agent, the registry agent in turn invoking executing in the virtualization management server in response to creation of the namespace, a management application programming interface (API) of the container image registry to create a project for the container images;
    invoking, by the registry service, the management API of the container image registry to both add members to the project, and assign image registry roles to the members, in response to bindings of users and namespace roles derived from the constraints;
    deploying workloads in the VMs within the constraints of the namespace, the workloads comprising the containers.

8. The non-transitory computer readable medium of claim 7, wherein the registry agent executes in a master server of the orchestration control plane.

9. The non-transitory computer readable medium of claim 8, further comprising:
    detecting, by the registry agent, an update to the bindings;

invoking, by the registry agent, an API of the registry service of the update to the bindings; and invoking, by the registry service through the registry agent, the management API of the container image registry to update the members of the project, the image registry roles assigned to the members, or both in response to the update to the bindings.

10. The non-transitory computer readable medium of claim 7, wherein a master server of the orchestration control plane includes an API server having the admin API, and wherein the API server forwards calls of the admin API by the registry service to the registry agent.

11. The non-transitory computer readable medium of claim 10, further comprising:

identifying, by the registry service, an update to the bindings; and calling, by the registry service, the admin API of the registry agent to instruct the registry agent to call the management API of the container image registry to update the members of the project, the image registry roles assigned to the members, or both in response to the update to the bindings.

12. The non-transitory computer readable medium of claim 7, wherein the image registry roles of the container image registry include a first role having both push and pull image access and a second role having only pull image access, and wherein an edit role of the namespace roles is mapped to the first role and a view role of the namespace roles is mapped to the second role.

13. A virtualized computing system having a container image registry and a host cluster, the host cluster including hosts and a virtualization layer executing on hardware platforms of the hosts, the virtualization layer supporting execution of virtual machines (VMs), the container image registry managing container images for deploying containers in the host cluster, the virtualized computing system comprising:

a virtualization management server configured to manage the host cluster, the virtualization management server configured to create a namespace for an orchestration control plane integrated with the virtualization layer, the namespace including constraints;

workloads deployed in VMs within the constraints of the namespace, the workloads comprising the containers; and a registry service executing in the virtualization management server, the registry service configured to:

invoke, in response to creation of the namespace, an administrative API (admin API) of a registry agent, the registry agent in turn invoking a management application programming interface (API) of the container image registry to create a project for the container images; and invoke the management API of the container image registry to both add members to the project, and assign image registry roles to the members, in response to bindings of users and namespace roles derived from the constraints.

14. The virtualized computing system of claim 13, wherein the registry agent executes in a master server of the orchestration control plane.

15. The virtualized computing system of claim 14, wherein the registry service is further configured to:

detect an update to the bindings;

invoke an API of the registry service of the update to the bindings; and invoke, through the registry agent, the management API of the container image registry to update the members of the project, the image registry roles assigned to the members, or both in response to the update to the bindings.

16. The virtualized computing system of claim 13, wherein a master server of the orchestration control plane includes an API server having the admin API, and wherein the API server forwards calls of the admin API by the registry service to the registry agent.

17. The virtualized computing system of claim 16, wherein the registry service is further configured to:

identify an update to the bindings; and call the admin API of the registry agent to instruct the registry agent to call the management API of the container image registry to update the members of the project, the image registry roles assigned to the members, or both in response to the update to the bindings.

* * * * *